(12) United States Patent
Iwamura et al.

(10) Patent No.: US 10,106,952 B2
(45) Date of Patent: Oct. 23, 2018

(54) WORK MACHINE CONTROL SYSTEM, WORK MACHINE, AND WORK MACHINE CONTROL METHOD

(71) Applicant: Komatsu Ltd., Tokyo (JP)

(72) Inventors: Tsutomu Iwamura, Yokohama (JP); Yuhei Yamamoto, Naka-gun (JP); Yuto Fujii, Hirakata (JP); Takashi Yokoo, Hirakata (JP); Yoshiro Iwasaki, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/328,584

(22) PCT Filed: May 31, 2016

(86) PCT No.: PCT/JP2016/066082
§ 371 (c)(1),
(2) Date: Jan. 24, 2017

(87) PCT Pub. No.: WO2016/186221
PCT Pub. Date: Nov. 24, 2016

(65) Prior Publication Data
US 2017/0342680 A1    Nov. 30, 2017

(51) Int. Cl.
*E02F 3/43* (2006.01)
*E02F 3/32* (2006.01)
(Continued)

(52) U.S. Cl.
CPC .......... *E02F 3/435* (2013.01); *E02F 3/32* (2013.01); *E02F 3/369* (2013.01); *E02F 9/0866* (2013.01);
(Continued)

(58) Field of Classification Search
CPC ... E02F 3/32; E02F 3/369; E02F 3/435; E02F 9/0866; E02F 9/16; E02F 9/22;
(Continued)

(56) References Cited

U.S. PATENT DOCUMENTS 5,752,333 A * 5/1998 Nakagawa .............. E02F 3/437
172/2
5,835,874 A * 11/1998 Hirata .................... E02F 3/435
414/4

(Continued)

FOREIGN PATENT DOCUMENTS

JP        06-193090 A      7/1994
JP        2005-180170 A    7/2005
(Continued)

OTHER PUBLICATIONS

International Search Report dated Aug. 30, 2016, issued for PCT/JP2016/066082.

*Primary Examiner* — Tyler J Lee
(74) *Attorney, Agent, or Firm* — Locke Lord LLP

(57) ABSTRACT

A work machine control system that controls a work machine including a working device having a working tool that rotates about a shaft line includes: a target construction shape generation unit that generates a target construction shape indicating a target shape of a construction target of the work machine; a target shape calculation unit that calculates a control target shape which is a target shape when controlling rotation of the working tool from the target construction shape and calculates an extended target shape obtained by extending the control target shape; and a working device control unit that controls the rotation of the working tool about the shaft line based on a distance between the working tool and the control target shape and the extended target shape.

8 Claims, 22 Drawing Sheets

(51) Int. Cl.
*G05D 1/02* (2006.01)
*E02F 3/36* (2006.01)
*E02F 9/22* (2006.01)
*E02F 9/16* (2006.01)
*E02F 9/08* (2006.01)
*E02F 9/26* (2006.01)

(52) U.S. Cl.
CPC . *E02F 9/16* (2013.01); *E02F 9/22* (2013.01); *E02F 9/2267* (2013.01); *E02F 9/2271* (2013.01); *E02F 9/2296* (2013.01); *E02F 9/264* (2013.01); *G05D 1/0278* (2013.01); *G05D 2201/0202* (2013.01)

(58) Field of Classification Search
CPC ..... E02F 9/2267; E02F 9/2271; E02F 9/2296; E02F 9/264; G05D 1/0278; G05D 2201/0202
USPC .......................................................... 701/50
See application file for complete search history.

(56) References Cited

U.S. PATENT DOCUMENTS

| | | | | |
|---|---|---|---|---|
| 5,996,702 A | * | 12/1999 | Hall | E02F 9/26 172/4.5 |
| 6,076,029 A | * | 6/2000 | Watanabe | E02F 3/437 172/4 |
| 6,108,949 A | * | 8/2000 | Singh | E02F 3/437 37/195 |
| 6,691,437 B1 | * | 2/2004 | Yost | E02F 3/435 356/141.2 |
| 7,007,415 B2 | | 3/2006 | Koch | |
| 7,079,931 B2 | * | 7/2006 | Sahm | E02F 3/431 37/414 |
| 7,516,563 B2 | * | 4/2009 | Koch | E02F 3/435 37/348 |
| 9,650,755 B2 | | 5/2017 | Nomura et al. | |
| 9,663,917 B2 | | 5/2017 | Fujii et al. | |
| 2005/0131610 A1 | * | 6/2005 | Sahm | E02F 3/431 701/50 |
| 2005/0132618 A1 | | 6/2005 | Koch | |
| 2015/0345114 A1 | | 12/2015 | Nomura et al. | |
| 2016/0289928 A1 | | 10/2016 | Kitajima | |
| 2017/0107688 A1 | | 4/2017 | Fujii et al. | |
| 2018/0002900 A1 | * | 1/2018 | Morimoto | E02F 9/261 |

FOREIGN PATENT DOCUMENTS

| | | |
|---|---|---|
| JP | 2014-074319 A | 4/2014 |
| KR | 20170045146 A | 4/2017 |
| WO | 2015/186179 A1 | 12/2015 |

\* cited by examiner

WORK MACHINE CONTROL SYSTEM, WORK MACHINE, AND WORK MACHINE CONTROL METHOD

FIELD

The present invention relates to a work machine control system, a work machine, and a work machine control method.

BACKGROUND

A work machine including a working device having a tilting bucket as a working tool, as disclosed in Patent Literature 1 is known.

CITATION LIST

Patent Literature

Patent Literature 1: WO 2015/186179 A

SUMMARY

Technical Problem

In a technical field related to control of a work machine, working device control of stopping a bucket so that the bucket does not enter a target construction shape indicating a target shape of a construction target and moving the bucket to a position at which the bucket does not enter the target construction shape when the bucket has entered the target construction shape with the aid of an operator of the work machine operating a manipulation lever is known. When working device control is executed, the bucket is suppressed from moving over the target construction shape and construction is realized according to the target construction shape.

For example, although two surfaces are connected in the shoulder or the like of a slope, when such a portion is constructed, there is a demand to position the tip of a bucket on one surface by allowing the bucket to perform a tilting operation. In the shoulder or the like of a slope, a target construction shape is discontinuous in a portion in which two surfaces are connected. When a discontinuous portion is present in the target construction shape, the bucket may perform a tilting operation up to a surface of the discontinuous portion on the opposite side of a surface on which the bucket is to be positioned. As a result, there is a possibility that it is not possible to position the bucket which is a working tool on a desired target construction shape.

An object of an aspect of the present invention is to allow a working tool to be positioned on a target construction shape of a construction target of a work machine.

Solution to Problem

According to a first aspect of the present invention, a work machine control system that controls a work machine including a working device including a working tool that rotates about a shaft line, comprises: a target construction shape generation unit that generates a target construction shape indicating a target shape of a construction target of the work machine; a target shape calculation unit that calculates a control target shape which is a target shape when controlling rotation of the working tool from the target construction shape and calculates an extended target shape obtained by extending the control target shape; and a working device control unit that controls the rotation of the working tool about the shaft line based on a distance between the working tool and the control target shape and the extended target shape.

According to a second aspect of the present invention, the work machine control system according to aspect, further comprises: a determination unit that determines whether the extended target shape will be used as a target when the working device control unit controls the rotation of the working tool or not, wherein when the determination unit determines that the extended target shape is to be used as a target when the working device control unit controls the rotation of the working tool, the working device control unit controls the rotation of the working tool about the shaft line based on the distance between the working tool and the control target shape and the extended target shape, and when the determination unit determines that the extended target shape is not to be used as a target when the working device control unit controls the rotation of the working tool, the working device control unit controls the rotation of the working tool about the shaft line based on the distance between the working tool and the control target shape.

According to a third aspect of the present invention, the work machine control system according to aspect 2, wherein the determination unit determines whether the extended target shape will be used as the target when stopping the working tool or not based on overlap between the working tool and the target construction shape, the distance between the working tool and the control target shape corresponding to the target construction shape, an attitude of the working tool, and a manipulation state of the working device.

According to a fourth aspect of the present invention, the work machine control system according to aspect 3, wherein the determination unit sets a magnitude of the overlap when the extended target shape is determined as the target when stopping the working tool to be larger than a magnitude of the overlap when the extended target shape is not determined as the target.

According to a fifth aspect of the present invention, the work machine control system according to any one of aspects 1 to 4, further comprises: a regulation point position data calculation unit that calculates position data of a regulation point set to the working tool; and an operation plane calculation unit that calculates an operation plane which passes through the regulation point and is orthogonal to the shaft line, wherein the target shape calculation unit sets a portion in which the target construction shape and the operation plane cross each other as the control target shape and sets a portion obtained by extending the control target shape in parallel to the control target shape as the extended target shape.

According to a sixth aspect of the present invention, a work machine comprises: an upper swinging body; a lower traveling body that supports the upper swinging body; a working device which includes a boom that rotates about a first shaft, an arm that rotates about a second shaft, and a bucket that rotates about a third shaft, the working device being supported on the upper swinging body; and the work machine control system according to any one of aspects 1 to 5, wherein the working tool is at least one of the bucket, the arm, the boom, and the upper swinging body.

According to a seventh aspect of the present invention, The work machine according to aspect 6, wherein the working tool is the bucket and the shaft line is orthogonal to the third shaft.

According to a eighth aspect of the present invention, a work machine control method of controlling a work machine including a working device including a working tool that rotates about a shaft line, comprises: generating a target construction shape indicating a target shape of a construction target of the work machine; calculating a control target shape which is a target shape when controlling rotation of the working tool from the target construction shape and calculating an extended target shape obtained by extending the control target shape; and controlling the rotation of the working tool about the shaft line based on a distance between the working tool and the control target shape and the extended target shape.

According to the aspect of the present invention, it is possible to position a working tool on a target construction shape of a construction target of a work machine.

DESCRIPTION OF EMBODIMENTS

Modes (present embodiments) for carrying out the present invention will be described in detail with reference to the drawings.

In the following description, a global coordinate system (Xg-Yg-Zg coordinate system) and a vehicle body coordinate system (X-Y-Z coordinate system) are set to describe the positional relation between respective portions. The global coordinate system is a coordinate system indicating an absolute position defined by a global navigation satellite system (GNSS) like a global positioning system (GPS). The vehicle body coordinate system is a coordinate system indicating the relative position in relation to a reference position of a work machine.

In the present embodiment, stop control refers to control of stopping an operation of at least a portion of a working device based on the distance between the working device and a target construction shape of a construction target of a work machine. For example, when the bucket of the working device is a tilting bucket, the stop control may involve control of stopping a tilting operation of the bucket based on the distance between the bucket and a target construction shape. Stop control of stopping the tilting operation of the bucket will be appropriately referred to as tilting stop control.

[Work Machine]

Figure 1:
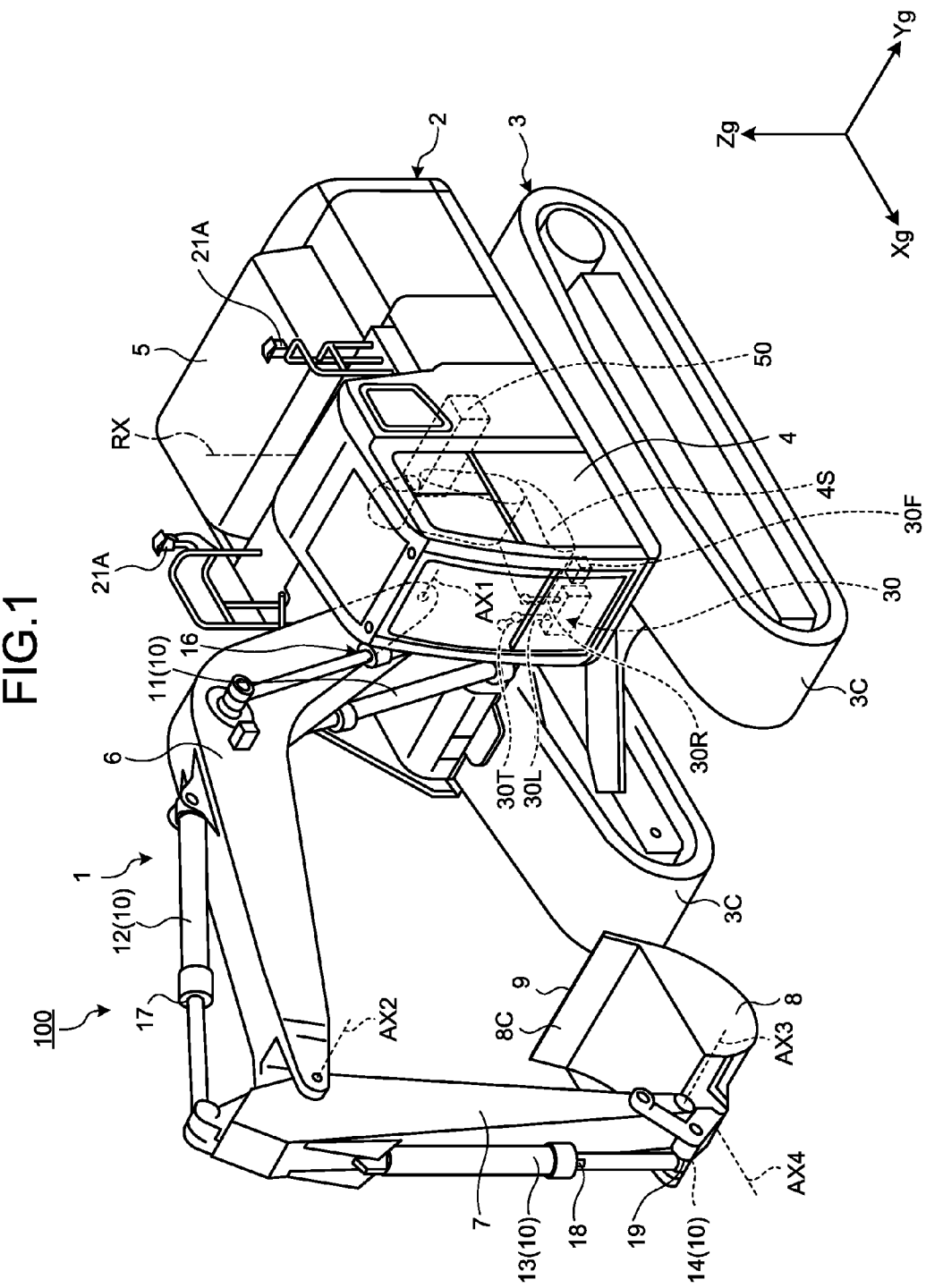
FIG. 1 is a perspective view illustrating an example of a work machine according to the present embodiment.

FIG. 1 is a perspective view illustrating an example of a work machine according to the present embodiment. In the present embodiment, an example in which the work machine is an excavator 100 will be described. The work machine is not limited to the excavator 100.

As illustrated in FIG. 1, the excavator 100 includes a working device 1 that operates with hydraulic pressure, an upper swinging body 2 which is vehicle body that supports the working device 1, a lower traveling body 3 which is a traveling device that supports the upper swinging body 2, a manipulation device 30 for operating the working device 1, and a control device 50 that controls the working device 1. The upper swinging body 2 can swing about a swing axis RX in a state of being supported on the lower traveling body 3.

The upper swinging body 2 has a cab 4 on which an operator boards and a machine room 5 in which an engine and a hydraulic pump are accommodated. The cab 4 has a driver's seat 4S on which the operator sits. The machine room 5 is disposed on the rear side of the cab 4.

The lower traveling body 3 has a pair of crawler belts 3C. The excavator 100 travels when the crawler belt 3C rotates. The lower traveling body 3 may have tires.

The working device 1 is supported on the upper swinging body 2. The working device 1 has a boom 6 connected to the upper swinging body 2 with a boom pin interposed therebetween, an arm 7 connected to the boom 6 with an arm pin interposed therebetween, and a bucket 8 connected to the arm 7 with a bucket pin and a tilting pin interposed therebetween. The bucket 8 has a blade 8C. The blade 8C is a planar member provided at a distal end of the bucket 8 (that is, a portion distant from the portion connected by the bucket pin). A tip 9 of the blade 8C is a distal end of the blade 8C, and in the present embodiment, is a straight portion. When a plurality of convex blades is formed on the bucket 8, the tip 9 is the distal end of the convex blade.

The boom 6 can rotate about a boom shaft AX1 which is a first shaft in relation to the upper swinging body 2. The arm 7 can rotate about an arm shaft AX2 which is a second shaft in relation to the boom 6. The bucket 8 can rotate about a bucket shaft AX3 which is a third shaft and a tilting shaft AX4 which is a shaft line orthogonal to an axis parallel to the bucket shaft AX3 in relation to the arm 7. The bucket shaft AX3 and the tilting shaft AX4 do not cross each other.

The boom shaft AX1, the arm shaft AX2, and the bucket shaft AX3 are parallel to each other. The boom shaft AX1, the arm shaft AX2, and the bucket shaft AX3 are orthogonal to an axis parallel to a swing axis RX. The boom shaft AX1, the arm shaft AX2, and the bucket shaft AX3 are parallel to the Y-axis of the vehicle body coordinate system. The swing axis RX is parallel to the Z-axis of the vehicle body coordinate system. The direction parallel to the boom shaft AX1, the arm shaft AX2, and the bucket shaft AX3 indicates a vehicle width direction of the upper swinging body 2. The direction parallel to the swing axis RX indicates an up-down direction of the upper swinging body 2. The direction orthogonal to the boom shaft AX1, the arm shaft AX2, the bucket shaft AX3, and the swing axis RX indicates a front-rear direction of the upper swinging body 2. A direction in which the working device 1 is present about the driver's seat 4S is the front side.

The working device 1 operates with the force generated by a hydraulic cylinder 10. The hydraulic cylinder 10 includes a boom cylinder 11 that operates the boom 6, an arm cylinder 12 that operates the arm 7, and a bucket cylinder 13 and a tilting cylinder 14 that operate the bucket 8.

The working device 1 has a boom stroke sensor 16, an arm stroke sensor 17, a bucket stroke sensor 18, and a tilting stroke sensor 19. The boom stroke sensor 16 detects a boom stroke indicating an operation amount of the boom cylinder 11. The arm stroke sensor 17 detects an arm stroke indicating an operation amount of the arm cylinder 12. The bucket stroke sensor 18 detects a bucket stroke indicating an operation amount of the bucket cylinder 13. The tilting stroke sensor 19 detects a tilting stroke indicating an operation amount of the tilting cylinder 14.

The manipulation device 30 is disposed in the cab 4. The manipulation device 30 includes an operating member operated by the operator of the excavator 100. The operator operates the manipulation device 30 to operate the working device 1. In the present embodiment, the manipulation device 30 includes a left manipulation lever 30L, a right manipulation lever 30R, a tilting manipulation lever 30T, and a manipulation pedal 30F.

The boom 6 performs a lowering operation when the right manipulation lever 30R at a neutral position is operated forward, and the boom 6 performs a raising operation when the right manipulation lever 30R is operated backward. The bucket 8 performs a dumping operation when the right manipulation lever 30R at the neutral position is operated rightward, and the bucket 8 performs a scooping operation when the right manipulation lever 30R is operated leftward.

The arm 7 performs an extending operation when the left manipulation lever 30L at the neutral position is operated forward, and the arm 7 performs a scooping operation when the left manipulation lever 30L is operated backward. The upper swinging body 2 swings rightward when the left manipulation lever 30L at the neutral position is operated rightward, and the upper swinging body 2 swings leftward when the left manipulation lever 30L is operated leftward.

The relations between the operation direction of the right manipulation lever 30R and the left manipulation lever 30L, the operation direction of the working device 1, and the swing direction of the upper swinging body 2 may be different from the above-described relations.

A control device 50 includes a computer system. The control device 50 has a processor such as a central processing unit (CPU), a storage device including a nonvolatile memory such as a read only memory (ROM) and a volatile memory such as a random access memory (RAM), and an input and output interface device.

[Bucket]

Figure 2:
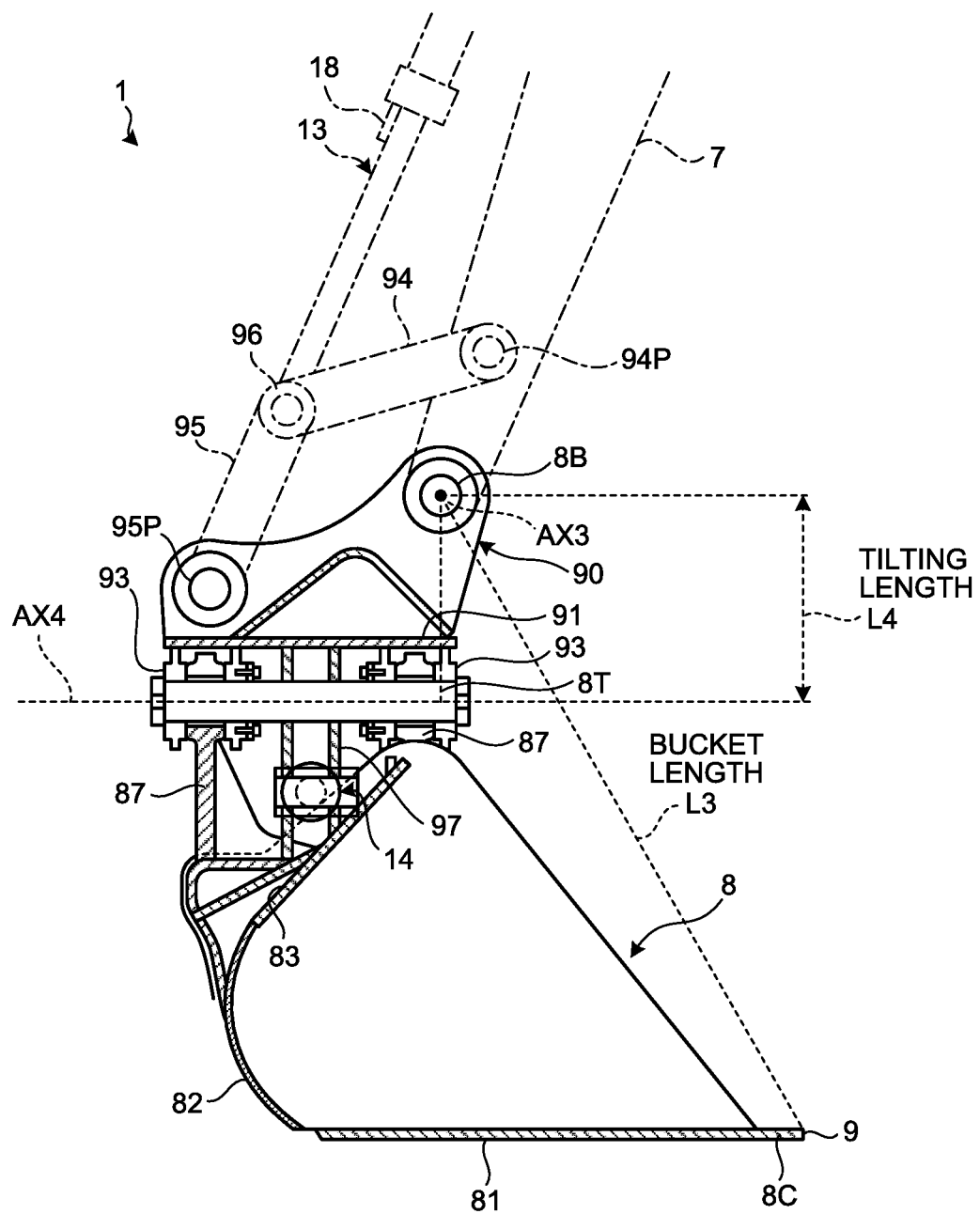
FIG. 2 is a side sectional view illustrating an example of a bucket according to the present embodiment.
Figure 3:
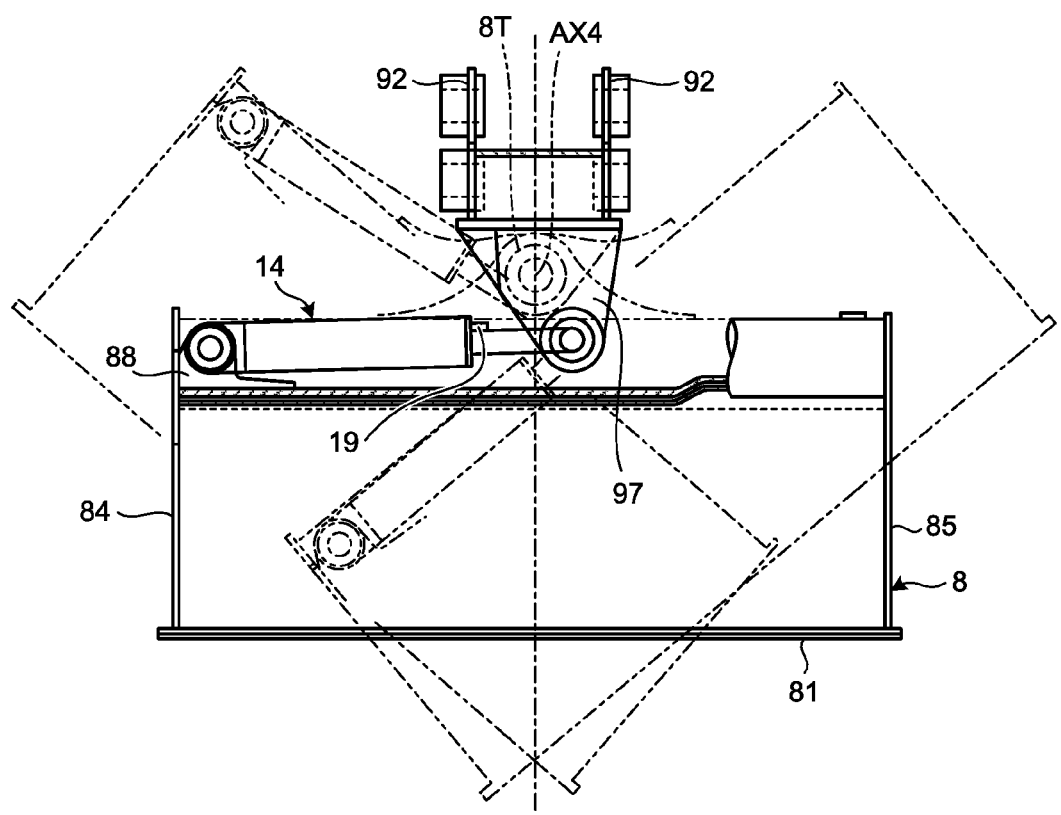
FIG. 3 is a front view illustrating an example of the bucket according to the present embodiment.

FIG. 2 is a side sectional view illustrating an example of the bucket 8 according to the present embodiment. FIG. 3 is a front view illustrating an example of the bucket 8 according to the present embodiment. In the present embodiment, the bucket 8 is a tilting bucket. The tilting bucket is a bucket that operates (for example, rotates) about the tilting shaft AX4 which is a shaft line. In the present embodiment, a member that rotates about a shaft line is the bucket 8.

The bucket 8 is not limited to the tilting bucket. The bucket 8 may be a rotating bucket. The rotating bucket is a bucket that rotates about a shaft line that vertically crosses the bucket shaft AX3.

As illustrated in FIGS. 2 and 3, the bucket 8 is rotatably connected to the arm 7 with a bucket pin 8B interposed therebetween. The bucket 8 is rotatably supported by the arm 7 with a tilting pin 8T interposed therebetween. The bucket 8 is connected to the distal end of the arm 7 with a connection member 90 interposed therebetween. The bucket pin 8B connects the arm 7 and the connection member 90. The tilting pin 8T connects the connection member 90 and the bucket 8. The bucket 8 is rotatably connected to the arm 7 with the connection member 90 interposed therebetween.

The bucket 8 includes a bottom plate 81, a rear plate 82, an upper plate 83, a side plate 84, and a side plate 85. The bucket 8 has a bracket 87 provided in an upper portion of the upper plate 83. The bracket 87 is provided at a front-rear position of the upper plate 83. The bracket 87 is connected to the connection member 90 and the tilting pin 8T.

The connection member 90 has a plate member 91, a bracket 92 provided on an upper surface of the plate member 91, and a bracket 93 provided on a lower surface of the plate member 91. The bracket 92 is connected to the arm 7 and a second link pin 95P. The bracket 93 is provided on an upper portion of the bracket 87 and is connected to the tilting pin 8T and the bracket 87.

The bucket pin 8B connects the bracket 92 of the connection member 90 and the distal end of the arm 7. The tilting pin 8T connects the bracket 93 of the connection member 90 and the bracket 87 of the bucket 8. The connection member 90 and the bucket 8 can rotate about the bucket shaft AX3 in relation to the arm 7. The bucket 8 can rotate about the tilting shaft AX4 in relation to the connection member 90.

The working device 1 has a first link member 94 that is rotatably connected to the arm 7 with a first link pin 94P interposed therebetween and a second link member 95 that is rotatably connected to the bracket 92 with a second link pin 95P interposed therebetween. A base end of the first link member 94 is connected to the arm 7 with the first link pin 94P interposed therebetween. A base end of the second link member 95 is connected to the bracket 92 with a second link pin 95P interposed therebetween. The distal end of the first link member 94 and the distal end of the second link member 95 are connected by a bucket cylinder top pin 96.

The distal end of the bucket cylinder 13 is rotatably connected to the distal end of the first link member 94 and the distal end of the second link member 95 with the bucket cylinder top pin 96 interposed therebetween. When the bucket cylinder 13 extends and retracts, the connection member 90 rotates about the bucket shaft AX3 together with the bucket 8.

The tilting cylinder 14 is connected to a bracket 97 provided in the connection member 90 and a bracket 88 provided in the bucket 8. The rod of the tilting cylinder 14 is connected to the bracket 97 with a pin interposed therebetween. A body portion of the tilting cylinder 14 is connected to the bracket 88 with a pin interposed therebetween. When the tilting cylinder 14 extends and retracts, the bucket 8 rotates about the tilting shaft AX4. The connection structure of the tilting cylinder 14 is an example and is not limited to the structure of the present embodiment.

In this manner, the bucket 8 rotates about the bucket shaft AX3 when the bucket cylinder 13 operates. The bucket 8 rotates about the tilting shaft AX4 when the tilting cylinder 14 operates. When the bucket 8 rotates about the bucket shaft AX3, the tilting pin 8T rotates together with the bucket 8.

[Detection System]

Figure 4:
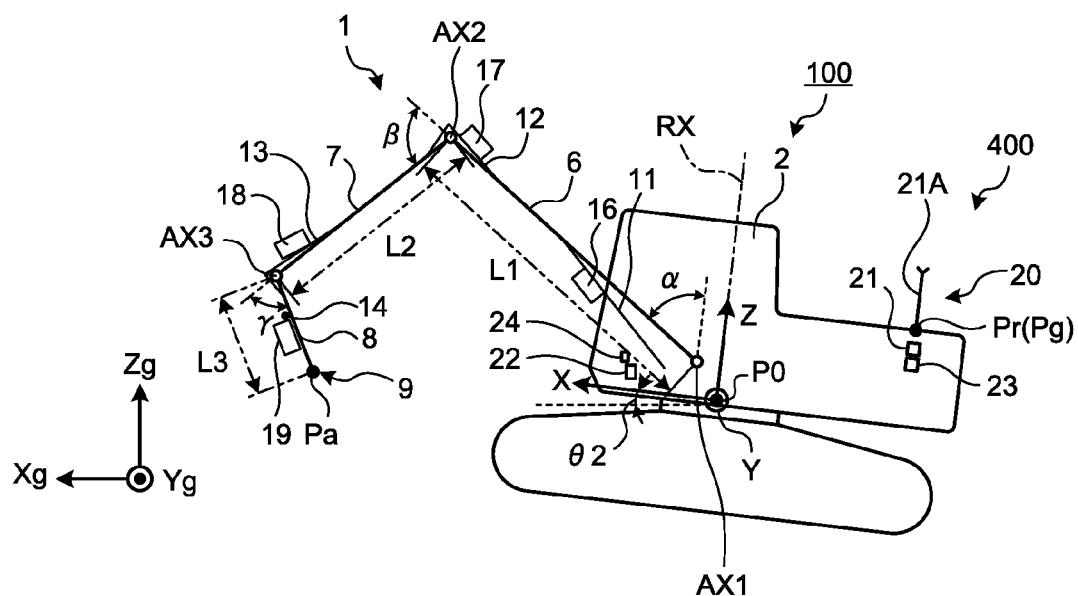
FIG. 4 is a side view schematically illustrating an excavator.
Figure 5:
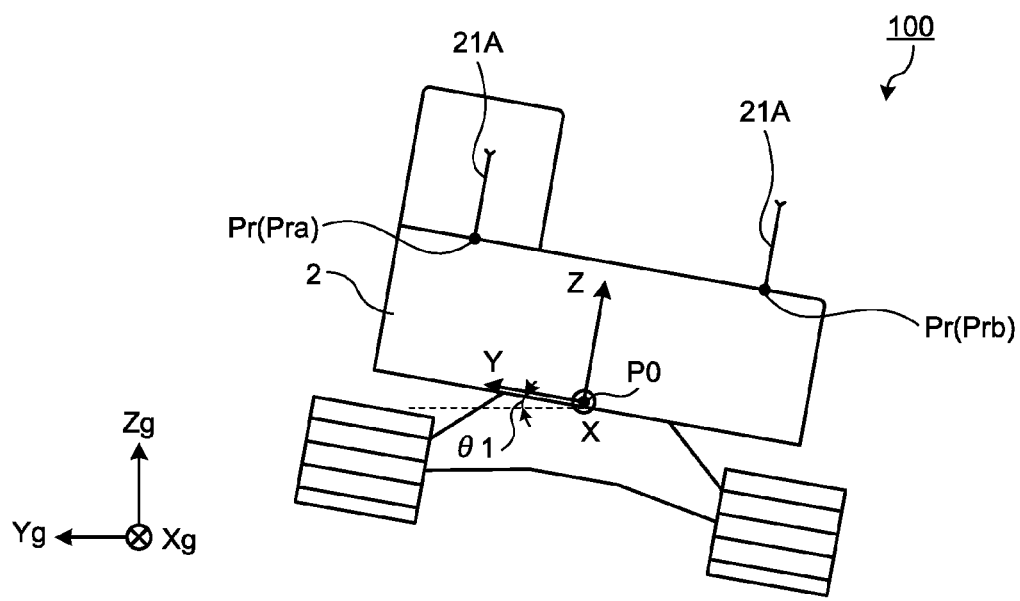
FIG. 5 is a rear view schematically illustrating an excavator.
Figure 6:
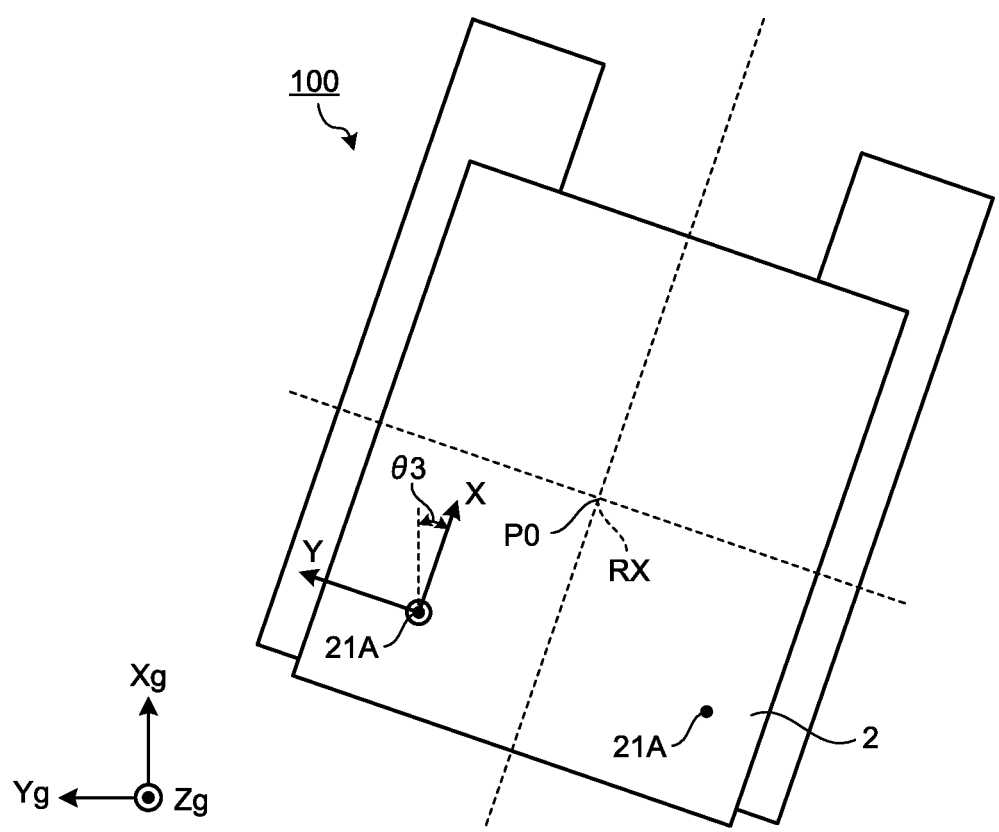
FIG. 6 is a plan view schematically illustrating an excavator.
Figure 7:
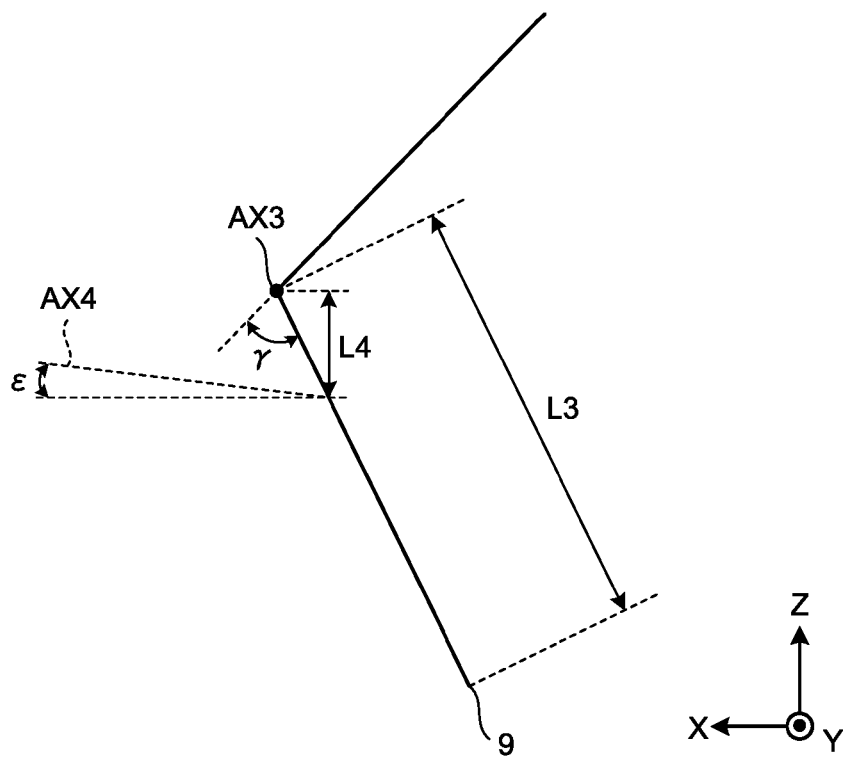
FIG. 7 is a side view schematically illustrating a bucket.
Figure 8:
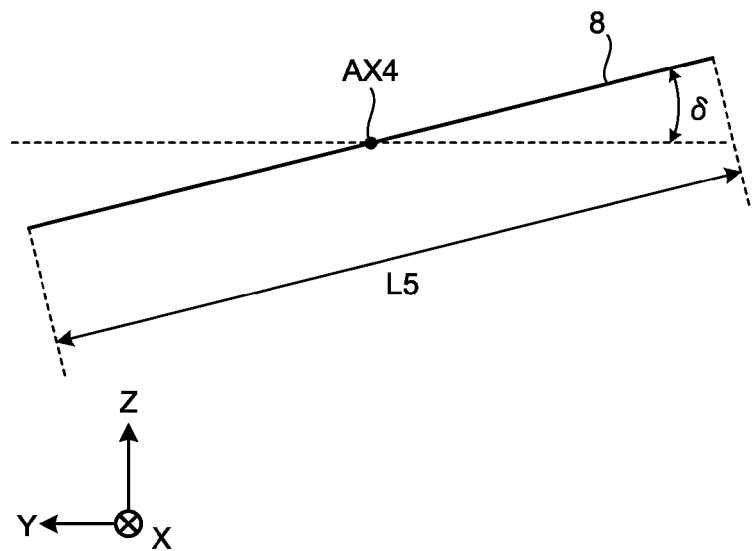
FIG. 8 is a front view schematically illustrating a bucket.

Next, a detection system 400 of the excavator 100 will be described. FIG. 4 is a side view schematically illustrating the excavator 100. FIG. 5 is a rear view schematically illustrating the excavator 100. FIG. 6 is a plan view schematically illustrating the excavator 100. FIG. 7 is a side view schematically illustrating the bucket 8. FIG. 8 is a front view schematically illustrating the bucket 8.

As illustrated in FIGS. 4, 5, and 6, the detection system 400 has a position detection device 20 that detects the position of the upper swinging body 2 and a working device angle detection device 24 that detects the angle of the working device 1. The position detection device 20 includes a vehicle body position calculator 21 that detects the position of the upper swinging body 2, a posture calculator 22 that detects the attitude of the upper swinging body 2, and an orientation calculator 23 that detects the direction of the upper swinging body 2.

The vehicle body position calculator 21 includes a GPS receiver. The vehicle body position calculator 21 is provided in the upper swinging body 2. The vehicle body position calculator 21 detects an absolute position Pg (that is, the position in the global coordinate system (Xg-Yg-Zg)) of the upper swinging body 2 defined by the global coordinate system. The absolute position Pg of the upper swinging body 2 includes coordinate data in the Xg-axis direction, coordinate data in the Yg-axis direction, and coordinate data in the Zg-axis direction.

A plurality of GPS antennas 21A is installed in the upper swinging body 2. The GPS antenna 21A receives radio waves from GPS satellites, generates a signal based on the received radio waves, and outputs the generated signal to the vehicle body position calculator 21. The vehicle body position calculator 21 detects an installed position Pr of the GPS antenna 21A, defined by the global coordinate system based on the signal supplied from the GPS antenna 21A. The vehicle body position calculator 21 detects the absolute position Pg of the upper swinging body 2 based on the installed position Pr of the GPS antenna 21A.

Two GPS antennas 21A are installed in a vehicle width direction. The vehicle body position calculator 21 detects the installed position Pra of one GPS antenna 21A and the installed position Prb of the other GPS antenna 21A. The vehicle body position calculator 21 executes an arithmetic process based on at least one of the positions Pra and Prb to detect the absolute position Pg of the upper swinging body 2. In the present embodiment, the absolute position Pg of the upper swinging body 2 is the position Pra. The absolute position Pg of the upper swinging body 2 may be the position Prb and may be a position located between the positions Pra and Prb.

The posture calculator 22 includes an inertial measurement unit (IMU). The posture calculator 22 is provided in the upper swinging body 2. The posture calculator 22 detects an inclination angle of the upper swinging body 2 with respect to a horizontal plane (that is, the Xg-Yg plane) defined by the global coordinate system. The inclination angle of the upper swinging body 2 with respect to the horizontal plane includes a roll angle $\theta 1$ indicating the inclination angle of the upper swinging body 2 in the vehicle width direction and a pitch angle $\theta 2$ indicating the inclination angle of the upper swinging body 2 in the front-rear direction.

The orientation calculator 23 detects the direction of the upper swinging body 2 in relation to a reference direction defined by the global coordinate system based on the installed position Pra of one GPS antenna 21A and the installed position Prb of the other GPS antenna 21A. The orientation calculator 23 executes an arithmetic process based on the positions Pra and Prb to detect the direction of the upper swinging body 2 with reference to the reference direction. The orientation calculator 23 calculates a straight line connecting the positions Pra and Prb and detects the direction of the upper swinging body 2 with respect to the reference direction based on the angle between the calculated straight line and the reference direction. The direction of the upper swinging body 2 with respect to the reference direction includes a yaw angle $\theta 3$ indicating the angle between the reference direction and the direction of the upper swinging body 2.

As illustrated in FIGS. 4, 7, and 8, the working device angle detection device 24 calculates a boom angle $\alpha$ indicating the inclination angle of the boom 6 with respect to the Z-axis of the vehicle body coordinate system based on the boom stroke detected by the boom stroke sensor 16. The working device angle detection device 24 calculates an arm angle $\beta$ indicating the inclination angle of the arm 7 with respect to the boom 6 based on the arm stroke detected by the arm stroke sensor 17. The working device angle detection device 24 calculates a bucket angle γ indicating the inclination angle of the tip 9 of the bucket 8 with respect to the arm 7 based on the bucket stroke detected by the bucket stroke sensor 18. The working device angle detection device 24 calculates a tilting angle δ indicating the inclination angle of the bucket 8 with respect to the XY plane based on the tilting stroke detected by the tilting stroke sensor 19. The working device angle detection device 24 calculates a tilting axis angle s indicating the inclination angle of the tilting shaft AX4 with respect to the XY plane based on the boom stroke detected by the boom stroke sensor 16, the arm stroke detected by the arm stroke sensor 17, the bucket stroke detected by the bucket stroke sensor 18, and the tilting stroke detected by the tilting stroke sensor 19. The inclination angle of the working device 1 may be detected by an angular sensor other than the stroke sensor and may be detected by an optical measurement unit such as a stereo camera and a laser scanner.

[Hydraulic System]

Figure 9:
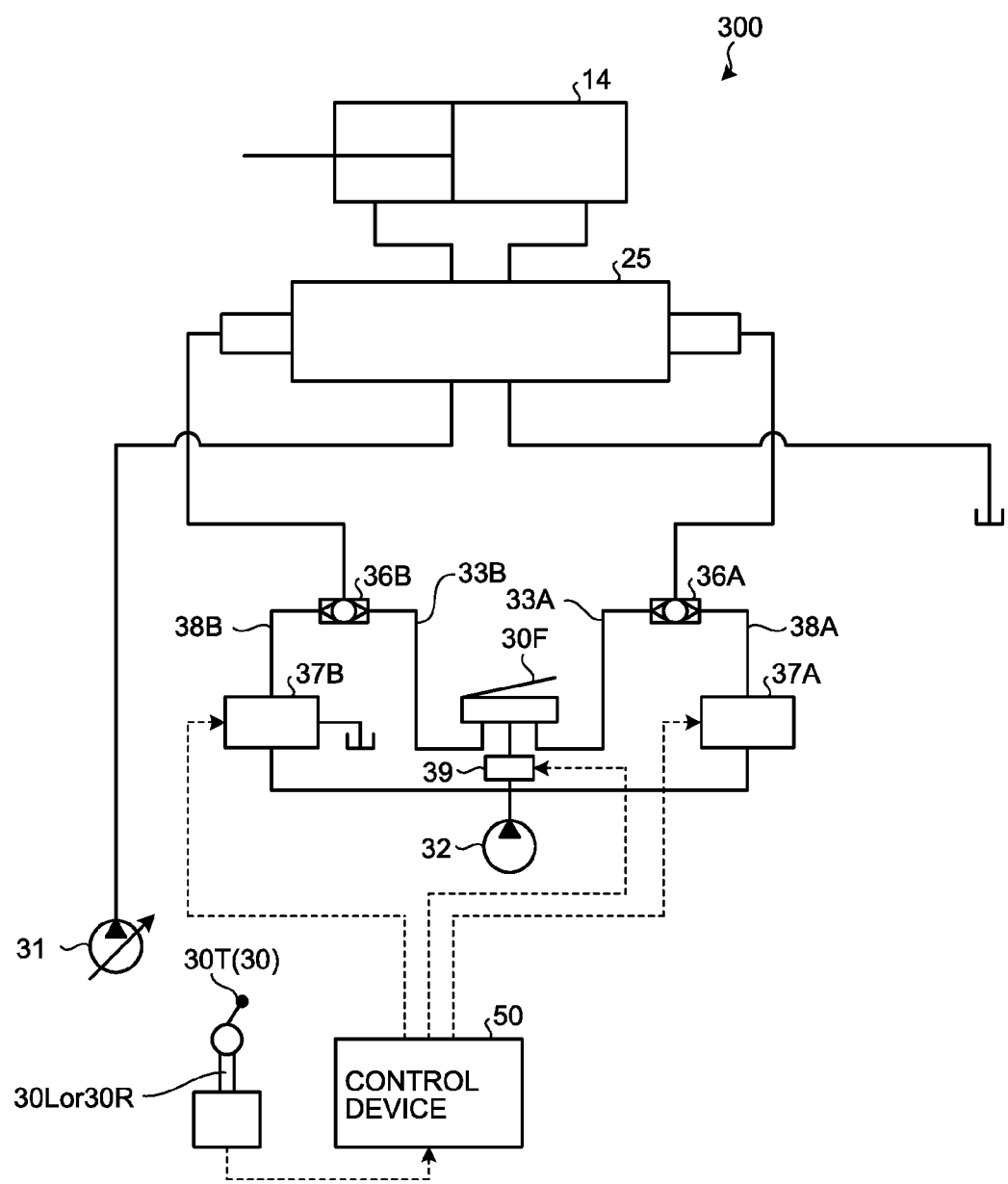
FIG. 9 is a diagram schematically illustrating an example of a hydraulic system that operates a tilting cylinder.

FIG. 9 is a diagram schematically illustrating an example of a hydraulic system 300 that operates the tilting cylinder 14. The hydraulic system 300 includes a variable capacitance-type main hydraulic pump 31 that supplies operating oil, a pilot pressure pump 32 that supplies pilot oil, a flow rate control valve 25 that adjusts the amount of operating oil supplied to the tilting cylinder 14, control valves 37A, 37B, and 39 that adjust the pilot pressure applied to the flow rate control valve 25, a tilting manipulation lever 30T and a manipulation pedal 30F of the manipulation device 30, and a control device 50. The tilting manipulation lever 30T is a button or the like provided in at least one of the left manipulation lever 30L and the right manipulation lever 30R. In the present embodiment, the manipulation pedal 30F of the manipulation device 30 is a pilot pressure-type manipulation device. The tilting manipulation lever 30T of the manipulation device 30 is an electromagnetic lever-type manipulation device.

The manipulation pedal 30F of the manipulation device 30 is connected to the pilot pressure pump 32. The control valve 39 is provided between the manipulation pedal 30F and the pilot pressure pump 32. Moreover, the manipulation pedal 30F is connected to an oil passage 38A through which the pilot oil delivered from the control valve 37A flows via a shuttle valve 36A. Moreover, the manipulation pedal 30F is connected to an oil passage 38B through which the pilot oil delivered from the control valve 37B flows via a shuttle valve 36B. When the manipulation pedal 30F is operated, the pressure of an oil passage 33A between the manipulation pedal 30F and the shuttle valve 36A and the pressure of an oil passage 33B between the manipulation pedal 30F and the shuttle valve 36B are adjusted.

When the tilting manipulation lever 30T is operated, an operation signal generated by the operation of the tilting manipulation lever 30T is output to the control device 50. The control device 50 generates a control signal based on the operation signal output from the tilting manipulation lever 30T and controls the control valves 37A and 37B. The control valves 37A and 37B are electromagnetic proportional control valves. The control valve 37A opens and closes the oil passage 38A based on the control signal. The control valve 37B opens and closes the oil passage 38B based on the control signal.

When tilting stop control is not executed, the pilot pressure is adjusted based on the operation amount of the manipulation device 30. When tilting stop control is executed, the control device 50 outputs a control signal to the control valves 37A and 37B or the control valve 39 to adjust the pilot pressure.

[Control System]

Figure 10:
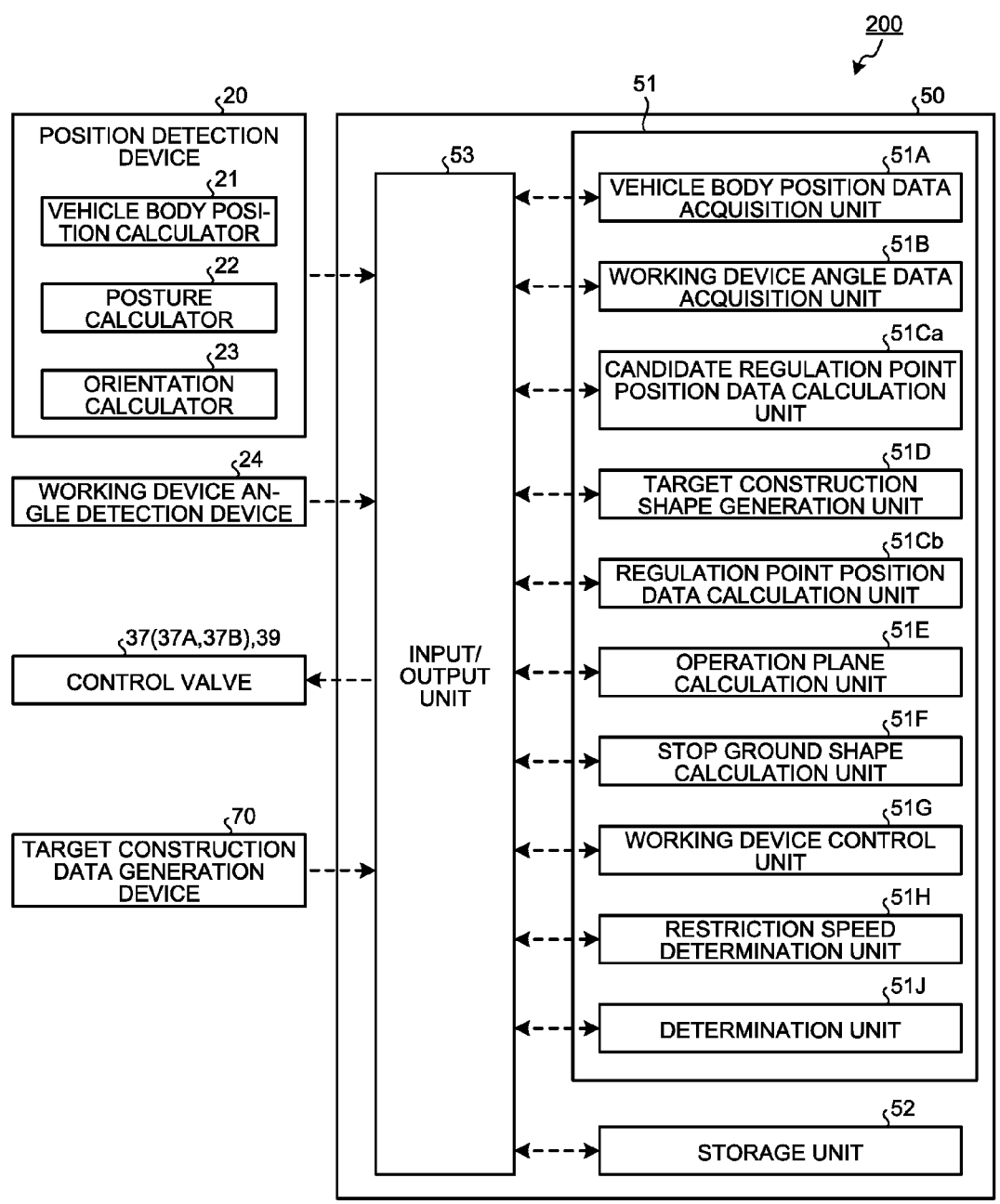
FIG. 10 is a functional block diagram illustrating an example of a control system of a work machine according to the present embodiment.

FIG. 10 is a functional block diagram illustrating an example of a control system 200 of the work machine according to the present embodiment. In the following description, the control system 200 of the work machine will be appropriately referred to as the control system 200. As illustrated in FIG. 10, the control system 200 includes the control device 50 that controls the working device 1, the position detection device 20, a working device angle detection device 24, a control valve 37 (37A, 37B) and 39, and a target construction data generation device 70.

The position detection device 20 detects the absolute position Pg of the upper swinging body 2, the attitude of the upper swinging body 2 including the roll angle θ1 and the pitch angle θ2, and the direction of the upper swinging body 2 including the yaw angle θ3. The working device angle detection device 24 detects the angle of the working device 1 including the boom angle α, the arm angle β, the bucket angle γ, the tilting angle δ, and the tilting axis angle ε. The control valve 37 (37A, 37B) adjusts the amount of the operating oil supplied to the tilting cylinder 14.

The control valve 37 operates based on the control signal supplied from the control device 50. The target construction data generation device 70 includes a computer system. The target construction data generation device 70 generates target construction data indicating a target ground shape which is a target shape of a construction area. The target construction data indicates three-dimensional target shape obtained after construction is finished by the working device 1.

The target construction data generation device 70 is provided in a place remote from the excavator 100. The target construction data generation device 70 is provided in a construction management facility, for example. The target construction data generation device 70 can wirelessly communicate with the control device 50. The target construction data generated by the target construction data generation device 70 is wirelessly transmitted to the control device 50.

The target construction data generation device 70 and the control device 50 may be connected by cables, and the target construction data may be transmitted from the target construction data generation device 70 to the control device 50. The target construction data generation device 70 may include a recording medium that stores the target construction data, and the control device 50 may have a device capable of reading the target construction data from the recording medium.

The target construction data generation device 70 may be provided in the excavator 100. The target construction data may be supplied in a wired or wireless manner from an external management device that manages construction to the target construction data generation device 70 of the excavator 100, and the target construction data generation device 70 may store the supplied target construction data.

The control device 50 includes a processing unit 51, a storage unit 52, and an input/output unit 53. The processing unit 51 has a vehicle body position data acquisition unit 51A, a working device angle data acquisition unit 51B, a candidate regulation point position data calculation unit 51Ca, a target construction shape generation unit 51D, a regulation point position data calculation unit 51Cb, an operation plane calculation unit 51E, a stop ground shape calculation unit 51F, a working device control unit 51G, a restriction speed determination unit 51H, and a determination unit 51J. The storage unit 52 stores specification data of the excavator 100 including working device data.

The respective functions of the vehicle body position data acquisition unit 51A, the working device angle data acquisition unit 51B, the candidate regulation point position data calculation unit 51Ca, the target construction shape generation unit 51D, the regulation point position data calculation unit 51Cb, the operation plane calculation unit 51E, the stop ground shape calculation unit 51F, the working device control unit 51G, the restriction speed determination unit 51H, and the determination unit 51J of the processing unit 51 are realized by a processor of the control device 50. The function of the storage unit 52 is realized by a storage device of the control device 50. The function of the input/output unit 53 is realized by an input and output interface device of the control device 50.

The vehicle body position data acquisition unit 51A acquires vehicle body position data from the position detection device 20 via the input/output unit 53. The vehicle body position data includes the absolute position Pg of the upper swinging body 2 defined by the global coordinate system, the attitude of the upper swinging body 2 including the roll angle θ1 and the pitch angle θ2, and the direction of the upper swinging body 2 including the yaw angle θ3.

The working device angle data acquisition unit 51B acquires the working device angle data from the working device angle detection device 24 via the input/output unit 53. The working device angle data is the angle of the working device 1 including the boom angle α, the arm angle β, the bucket angle γ, the tilting angle δ, and the tilting axis angle ε.

The candidate regulation point position data calculation unit 51Ca calculates the position data of the regulation point RP set to the bucket 8. The candidate regulation point position data calculation unit 51Ca calculates the position data of the regulation point RP set to the bucket 8 based on the vehicle body position data acquired by the vehicle body position data acquisition unit 51A, the working device angle data acquired by the working device angle data acquisition unit 51B, and the working device data stored in the storage unit 52. The regulation point RP will be described later.

As illustrated in FIG. 4, the working device data includes a boom length L1, an arm length L2, a bucket length L3, a tilting length L4, and a bucket width L5. The boom length L1 is the distance between the boom shaft AX1 and the arm shaft AX2. The arm length L2 is the distance between the arm shaft AX2 and the bucket shaft AX3. The bucket length L3 is the distance between the bucket shaft AX3 and the tip 9 of the bucket 8. The tilting length L4 is the distance between the bucket shaft AX3 and the tilting shaft AX4. The bucket width L5 is the distance between the side plate 84 and the side plate 85.

Figure 11:
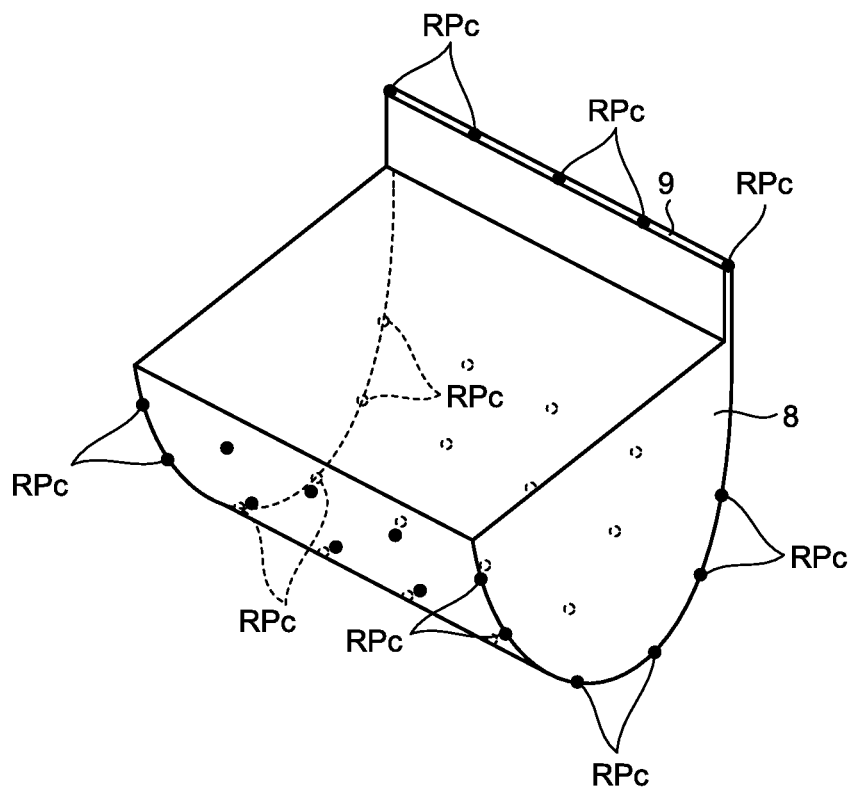
FIG. 11 is a diagram schematically illustrating an example of a regulation point set to a bucket according to the present embodiment.

FIG. 11 is a diagram schematically illustrating an example of the regulation point RP set to the bucket 8 according to the present embodiment. As illustrated in FIG. 11, a plurality of candidate regulation points RPc which are the candidates for the regulation point RP used for tilting bucket control is set to the bucket 8. The candidate regulation point RPc is set to the tip 9 of the bucket 8 and the outer surface of the bucket 8. A plurality of candidate regulation points RPc is set in the bucket width direction of the tip 9. Moreover, a plurality of candidate regulation points RPc is set to the outer surface of the bucket 8. The regulation point RP is one of the candidate regulation points RPc.

The working device data includes bucket shape data indicating the shape and the dimensions of the bucket 8. The bucket shape data includes the bucket width L5. The bucket shape data includes outline data of the outer surface of the bucket 8 and the coordinate data of the plurality of candidate regulation points RPc of the bucket 8 in relation to the tip 9 of the bucket 8.

The candidate regulation point position data calculation unit 51Ca calculates the relative positions of the plurality of candidate regulation points RPc in relation to a reference position P0 of the upper swinging body 2. Moreover, the candidate regulation point position data calculation unit 51Ca calculates the absolute positions of the plurality of candidate regulation points RPc.

The candidate regulation point position data calculation unit 51Ca can calculate the relative positions of the plurality of candidate regulation points RPc of the bucket 8 in relation to the reference position P0 of the upper swinging body 2 based on the working device data including the boom length L1, the arm length L2, the bucket length L3, the tilting length L4, and the bucket shape data and the working device angle data including the boom angle α, the arm angle β, the bucket angle γ, the tilting angle δ, and the tilting axis angle ε. As illustrated in FIG. 4, the reference position P0 of the upper swinging body 2 is set to the swing axis RX of the upper swinging body 2. The reference position P0 of the upper swinging body 2 may be set to the boom shaft AX1.

The candidate regulation point position data calculation unit 51Ca can calculate the absolute position Pa of the bucket 8 based on the absolute position Pg of the upper swinging body 2 detected by the position detection device 20 and the relative position of the bucket 8 in relation to the reference position P0 of the upper swinging body 2. The relative position between the absolute position Pg and the reference position P0 is known data derived from the specification data of the excavator 100. The candidate regulation point position data calculation unit 51Ca can calculate the absolute positions of the plurality of candidate regulation points RPc of the bucket 8 based on the vehicle body position data including the absolute position Pg of the upper swinging body 2, the relative position of the bucket 8 in relation to the reference position P0 of the upper swinging body 2, the working device data, and the working device angle data. The candidate regulation point RPc is not limited to points as long as the candidate regulation point includes the information on the width direction of the bucket 8 and the information on the outer surface of the bucket 8.

The target construction shape generation unit 51D generates a target construction shape CS indicating the target shape of a construction target based on the target construction data supplied from the target construction data generation device 70. The target construction data generation device 70 may supply three-dimensional target ground shape data to the target construction shape generation unit 51D as the target construction data and may supply a plurality of items of line data or a plurality of items of point data indicating a portion of the target shape to the target construction shape generation unit 51D. In the present embodiment, it is assumed that the target construction data generation device 70 supplies line data indicating a portion of the target shape to the target construction shape generation unit 51D as the target construction data.

Figure 12:
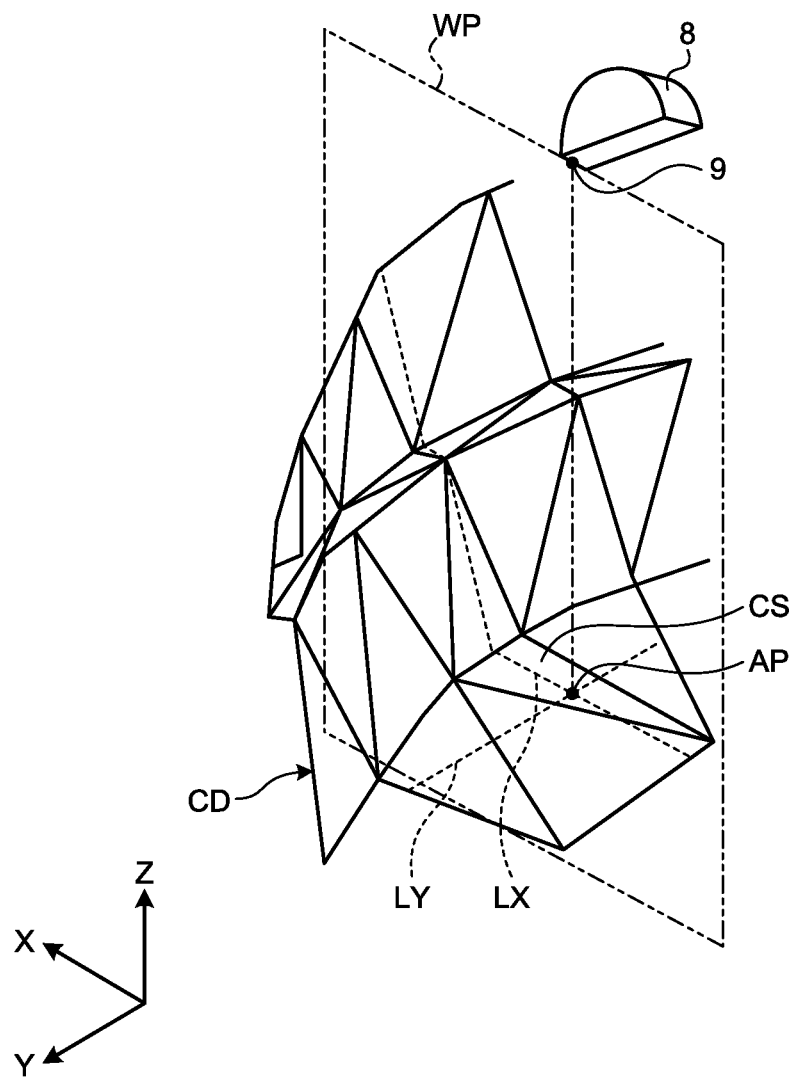
FIG. 12 is a schematic diagram illustrating an example of target construction data according to the present embodiment.

FIG. 12 is a schematic diagram illustrating an example of target construction data CD according to the present embodiment. As illustrated in FIG. 12, the target construction data CD indicates the target ground shape of the construction area. The target ground shape includes a plurality of target construction shapes CS each represented by a triangular polygon. Each of the plurality of target construction shapes CS indicates a target shape of the construction target constructed by the working device 1. In the target construction data CD, a point AP of which the vertical distance to the bucket 8 is the shortest is defined among the target construction shapes CS. Moreover, in the target construction data CD, a working device operation plane WP which passes through the point AP and the bucket 8 and is orthogonal to the bucket shaft AX3 is defined. The working device operation plane WP is an operation plane on which the tip 9 of the bucket 8 moves with the operation of at least one of the boom cylinder 11, the arm cylinder 12, and the bucket cylinder 13 and which is parallel to the XZ plane of the vehicle body coordinate system (X-Y-Z).

The target construction shape generation unit 51D acquires a line LX which is a nodal line between the working device operation plane WP and the target construction shape CS. Moreover, the target construction shape generation unit 51D acquires a line LY which passes through the point AP and crosses the line LX in the target construction shape CS. The line LY indicates a nodal line between the horizontal operation plane and the target construction ground shape CS. The horizontal operation plane is a plane which is orthogonal to the working device operation plane WP and passes through the point AP. The line LY extends in a lateral direction of the bucket 8 in the target construction ground shape CS.

Figure 13:
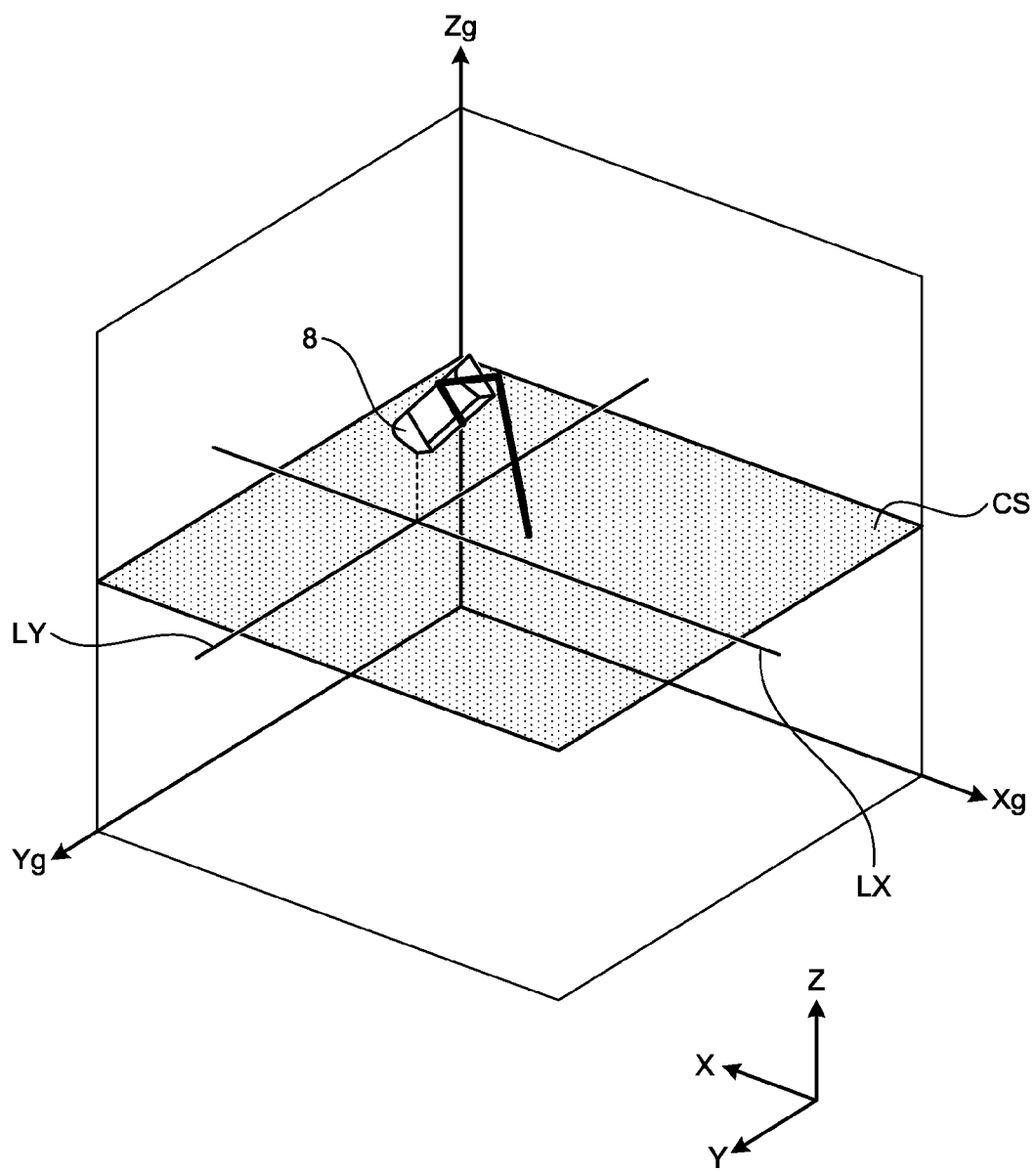
FIG. 13 is a schematic diagram illustrating an example of a target construction shape according to the present embodiment.

FIG. 13 is a schematic diagram illustrating an example of the target construction shape CS according to the present embodiment. The target construction shape generation unit 51D acquires the lines LX and LY to generate the target construction shape CS indicating the target shape of the construction target based on the lines LX and LY. When the target construction shape CS is excavated by the bucket 8, the control device 50 moves the bucket 8 along the line LX which passes through the bucket 8 and is the nodal line between the working device operation plane WP and the target construction shape CS.

In the present embodiment, even when the bucket 8 performs a tilting operation according to tilting control based on the line LY, the vertical distance on the regulation point RP and the line LY is acquired, and the control device 50 can control the bucket 8. Moreover, the control device 50 may perform tilting control based on a line parallel to the line LY based on the shortest distance between the target construction shape CS and the regulation point RP rather than the line LY only.

The operation plane calculation unit 51E calculates an operation plane which passes through a regulation point set to a member and is orthogonal to a shaft line. In the present embodiment, since the shaft line is the tilting shaft AX4 and the member is the bucket 8, the operation plane calculation unit 51E calculates a tilting operation plane TP which passes through the regulation point RP of the bucket 8 which is the member and is orthogonal to the tilting shaft AX4 which is the shaft line. The tilting operation plane TP corresponds to the operation plane described above.

Figure 14:
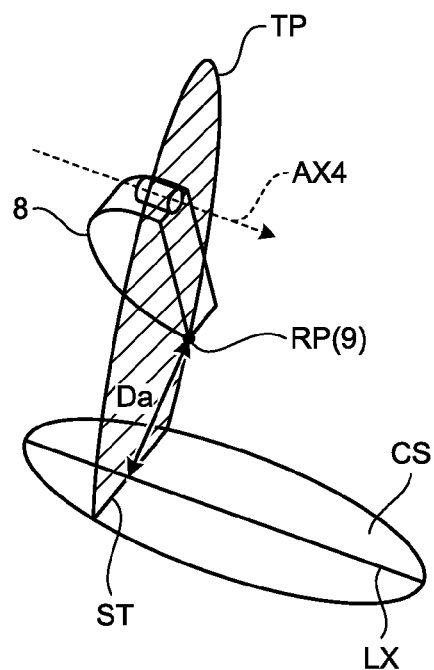
FIG. 14 is a schematic diagram illustrating an example of a tilting operation plane according to the present embodiment.
Figure 15:
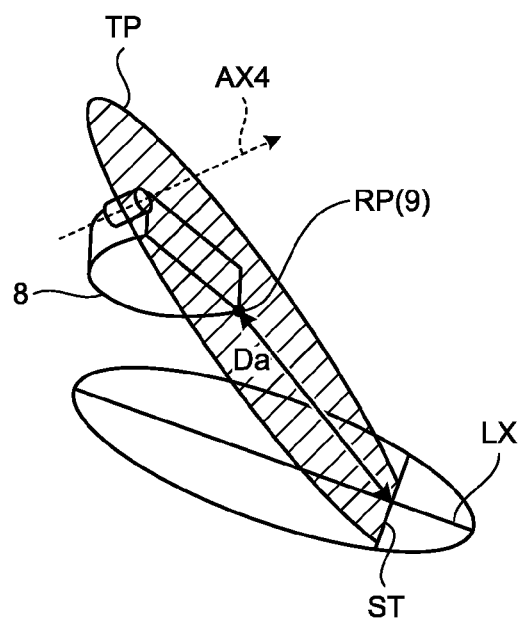
FIG. 15 is a schematic diagram illustrating an example of a tilting operation plane according to the present embodiment.

FIGS. 14 and 15 are schematic diagrams illustrating an example of the tilting operation plane TP according to the present embodiment. FIG. 14 illustrates the tilting operation plane TP when the tilting shaft AX4 is parallel to the target construction shape CS. FIG. 15 illustrates the tilting operation plane TP when the tilting shaft AX4 is not parallel to the target construction shape CS.

As illustrated in FIGS. 14 and 15, the tilting operation plane TP refers to an operation plane which passes through the regulation point RP selected from the plurality of candidate regulation points RPc defined in the bucket 8 and is orthogonal to the tilting shaft AX4. The regulation point RP is a regulation point RP which is determined to be best useful for tilting bucket control among the plurality of candidate regulation points RPc. The regulation point RP which is most useful for tilting bucket control is a regulation point RP of which the distance to the target construction shape CS is the shortest. The regulation point RP which is most useful for tilting bucket control may be a regulation point RP at which the cylinder speed of the hydraulic cylinder 10 is the fastest when tilting bucket control is executed based on the regulation point RP. The regulation point position data calculation unit 51Cb calculates the regulation point RP (specifically, the regulation point RP which is most useful for tilting bucket control) based on the width of the bucket 8, the candidate regulation point RPc which is the outer surface information, and the target construction shape CS.

FIGS. 14 and 15 illustrate the tilting operation plane TP that passes through the regulation point RP set to the tip 9 as an example. The tilting operation plane TP is an operation plane on which the regulation point RP (the tip 9) of the bucket 8 moves with the operation of the tilting cylinder 14. When at least one of the boom cylinder 11, the arm cylinder 12, and the bucket cylinder 13 operates and the tilting axis angle ε indicating the direction of the tilting shaft AX4 changes, the inclination of the tilting operation plane TP also changes.

As described above, the working device angle detection device 24 calculates the tilting axis angle ε indicating the inclination angle of the tilting shaft AX4 with respect to the XY plane. The tilting axis angle ε is acquired by the working device angle data acquisition unit 51B. Moreover, the position data of the regulation point RP is calculated by the candidate regulation point position data calculation unit 51Ca. The operation plane calculation unit 51E calculates the tilting operation plane TP based on the tilting axis angle ε of the tilting shaft AX4 acquired by the working device angle data acquisition unit 51B and the position of the regulation point RP calculated by the candidate regulation point position data calculation unit 51Ca.

The target shape calculation unit 51F calculates a tilting stop ground shape ST which is a control target shape from the target construction shape CS. In the present embodiment, the control target shape is a portion in which the target construction shape CS and the operation plane cross each other. In the present embodiment, since the operation plane is the tilting operation plane TP, the target shape calculation unit 51F calculates a control target shape defined by the portion in which the target construction shape CS and the tilting operation plane TP cross each other. This control target shape will be hereinafter appropriately referred to as a tilting stop ground shape ST. The stop ground shape calculation unit 51F calculates a tilting target ground shape ST extending in a lateral direction of the bucket 8 in the target construction ground shape CS based on the position data of the regulation point RP selected from the plurality of candidate regulation points RPc, the target construction ground shape CS, and the tilting data. As illustrated in FIGS. 14 and 15, the tilting stop ground shape ST is represented by a nodal line between the target construction shape CS and the tilting operation plane TP. When the tilting axis angle ε which is the direction of the tilting shaft AX4 changes, the position of the tilting stop ground shape ST changes.

The target shape calculation unit 51F calculates an extended target shape obtained by extending the tilting stop ground shape ST. In the present embodiment, the extended target shape is a portion obtained by extending the tilting stop ground shape ST in parallel to the tilting stop ground shape ST. The extended target shape will be described later.

The working device control unit 51G outputs a control signal for controlling the hydraulic cylinder 10. When tilting stop control is executed, the working device control unit 51G executes tilting stop control of stopping the tilting operation of the bucket 8 about the tilting shaft AX4 based on the operation distance Da indicating the distance between the tilting stop ground shape ST and the regulation point RP of the bucket 8. That is, in the present embodiment, tilting stop control is executed based on the tilting stop ground shape ST. In the tilting stop control, the working device control unit 51G controls the bucket 8 to stop at the tilting stop ground shape ST so that the bucket 8 performing a tilting operation does not exceed the tilting stop ground shape ST.

The working device control unit 51G executes tilting stop control based on the regulation point RP of which the operation distance Da is the shortest among the plurality of candidate regulation points RPc set to the bucket 8. That is, the working device control unit 51G executes tilting stop control based on the operation distance Da between the tilting stop ground shape ST and the regulation point RP which is closest to the tilting stop ground shape ST so that the regulation point RP closest to the tilting stop ground shape ST among the plurality of candidate regulation points RPc regulation points RP set to the bucket 8 does not exceed the tilting stop ground shape ST.

The restriction speed determination unit 51H determines a restriction speed U for the tilting operation speed of the bucket 8 based on the operation distance Da. The restriction speed determination unit 51H limits the tilting operation speed when the operation distance Da is equal to or smaller than a line distance H which is a threshold.

The determination unit 51J determines whether the tilting stop ground shape ST present in a range outside the target construction shape CS will be used as a target when the working device control unit 51G stops the bucket 8 or not. When the tilting stop ground shape ST present in a range outside the target construction shape CS is used as a target, the working device control unit 51G controls the tilting operation of the bucket 8 so that the bucket 8 does not exceed the range where the target construction shape CS is present and the tilting stop ground shape ST present in the range outside the target construction shape CS. When the tilting stop ground shape ST present in the range outside the target construction shape CS is not used as a target, the working device control unit 51G controls the tilting operation of the bucket 8 so that the bucket 8 does not exceed the tilting stop ground shape ST present in a range where the target construction shape CS is present.

Figure 16:
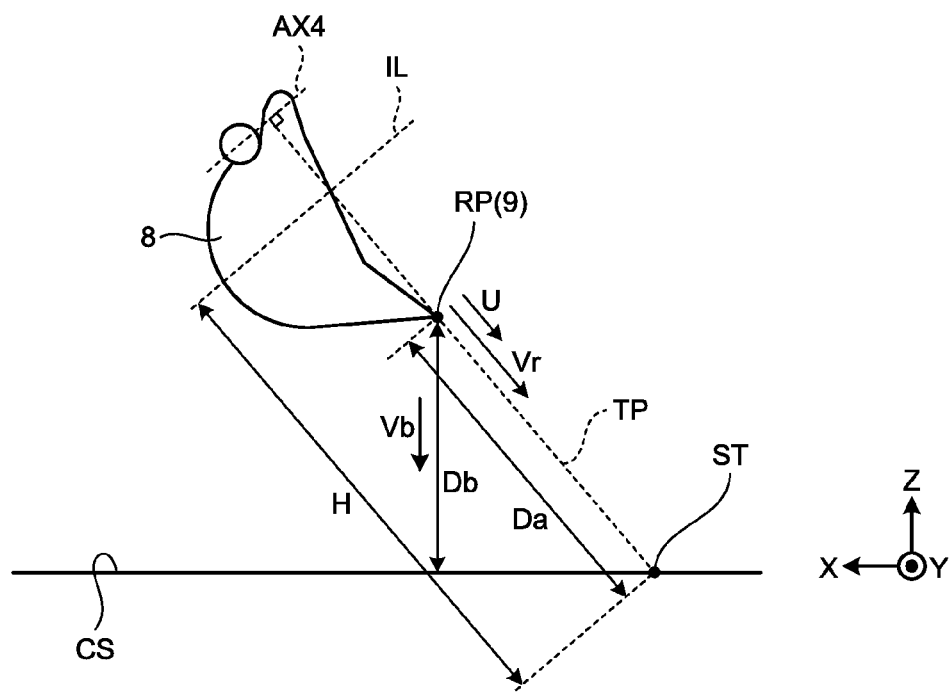
FIG. 16 is a schematic diagram for describing tilting stop control according to the present embodiment.

FIG. 16 is a schematic diagram for describing tilting stop control according to the present embodiment. As illustrated in FIG. 16, the target construction shape CS is defined and a speed limitation intervention line IL is defined. The speed limitation intervention line IL is parallel to the tilting shaft AX4 and is defined at a position separated by the line distance H from the tilting stop ground shape ST. The line distance H is preferably set so as not to impair the sense of operability of the operator. The working device control unit 51G limits the tilting operation speed of the bucket 8 when at least a portion of the bucket 8 performing a tilting operation exceeds the speed limitation intervention line IL and the operation distance Da is equal to or smaller than the line distance H. The restriction speed determination unit 51H determines the restriction speed U for the tilting operation speed of the bucket 8 which has exceeded the speed limitation intervention line IL. In the example illustrated in FIG. 16, since a portion of the bucket 8 exceeds the speed limitation intervention line IL and the operation distance Da is smaller than the line distance H, the tilting operation speed is limited.

The restriction speed determination unit 51H acquires the operation distance Da between the regulation point RP and the tilting stop ground shape ST in the direction parallel to the tilting operation plane TP. Moreover, the restriction speed determination unit 51H acquires the restriction speed U corresponding to the operation distance Da. The working device control unit 51G limits the tilting operation speed when it is determined that the operation distance Da is equal to or smaller than the line distance H.

Figure 17:
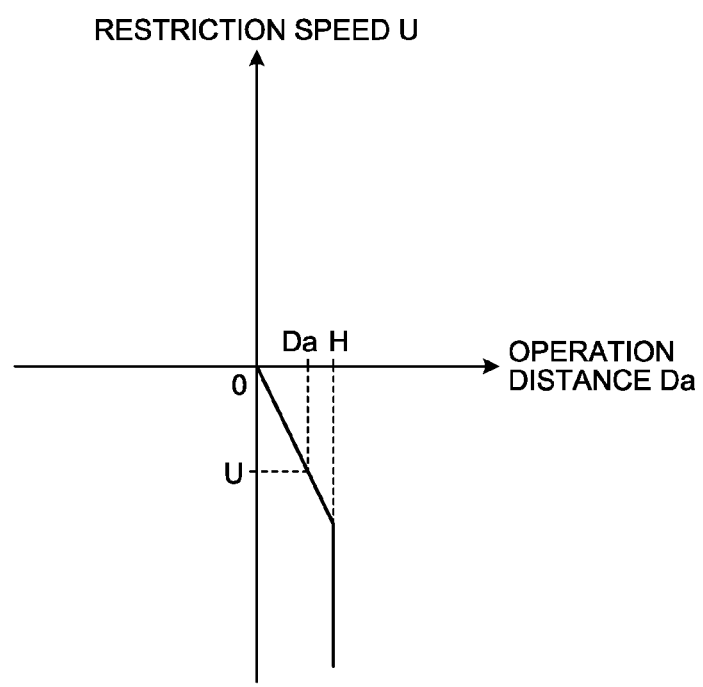
FIG. 17 is a diagram illustrating an example of the relation between an operation distance and a restriction speed in order to stop tilting rotation of a tilting bucket based on an operation distance.

FIG. 17 is a diagram illustrating an example of the relation between the operation distance Da and the restriction speed U in order to stop the tilting rotation of the tilting bucket based on the operation distance Da. As illustrated in FIG. 17, the restriction speed U is a speed determined according to the operation distance Da. The restriction speed U is not set when the operation distance Da is larger than the line distance H and is set when the operation distance Da is equal to or smaller than the line distance H. The smaller the operation distance Da, the smaller the restriction speed U, and the restriction speed U reaches zero when the operation distance Da reaches zero. In FIG. 17, the direction of approaching the target construction shape CS is depicted as a negative direction.

The restriction speed determination unit 51H calculates a movement speed Vr when the regulation point RP moves toward the target construction shape CS (the tilting stop ground shape ST) specified by the target construction data CD based on the operation amount of the tilting manipulation lever 30T of the manipulation device 30. The movement speed Vr is the movement speed of the regulation point RP in a plane parallel to the tilting operation plane TP. The movement speed Vr is calculated for each of the plurality of regulation points RP.

In the present embodiment, when the tilting manipulation lever 30T is operated, the movement speed Vr is calculated based on a current value output from the tilting manipulation lever 30T. When the tilting manipulation lever 30T is operated, a current corresponding to the operation amount of the tilting manipulation lever 30T is output from the tilting manipulation lever 30T. First correlation data indicating the relation between the pilot pressure and the current value output from the tilting manipulation lever 30T is stored in the storage unit 52. Moreover, second correlation data indicating the relation between the pilot pressure and a spool stroke indicating the moving amount of the spool is stored in the storage unit 52. Furthermore, third correlation data indicating the relation between the spool stroke and the cylinder speed of the tilting cylinder 14 is stored in the storage unit 52.

The first, second, and third correlation data are known data obtained in advance through tests, simulations, or the like. The restriction speed determination unit 51H calculates the cylinder speed of the tilting cylinder 14 corresponding to the operation amount of the tilting manipulation lever 30T based on the current value output from the tilting manipulation lever 30T and the first, second, and third correlation data stored in the storage unit 52. An actual detection value of the stroke sensor may be used as the cylinder speed. After the cylinder speed of the tilting cylinder 14 is obtained, the restriction speed determination unit 51H converts the cylinder speed of the tilting cylinder 14 to the movement speed Vr of each of the plurality of regulation points RP of the bucket 8 using the Jacobian determinant.

The working device control unit 51G executes speed limitation to limit the movement speed Vr of the regulation point RP in relation to the target construction shape CS to the restriction speed U when it is determined that the operation distance Da is equal to or smaller than the line distance H. The working device control unit 51G outputs a control signal to the control valve 37 in order to suppress the movement speed Vr of the regulation point RP of the bucket 8. The working device control unit 51G outputs a control signal to the control valve 37 so that the movement speed Vr of the regulation point RP of the bucket 8 reaches the restriction speed U corresponding to the operation distance Da. With this process, the movement speed of the regulation point RP of the bucket 8 decreases as the regulation point RP approaches the target construction shape CS (the tilting stop ground shape ST) and reaches zero when the regulation point RP (the tip 9) reaches the target construction shape CS.

In the present embodiment, the tilting operation plane TP is defined and the tilting stop ground shape ST which is the nodal line between the tilting operation plane TP and the target construction shape CS is derived. The working device control unit 51G executes tilting stop control so that the regulation point RP does not exceed the target construction shape CS based on the operation distance Da between the target construction shape CS and the regulation point RP which is the closest to the tilting stop ground shape ST among the plurality of candidate regulation points RPc. In the present embodiment, the position of the tilting stop ground shape ST does not change when the bucket 8 performs a tilting operation only. Therefore, an excavation operation using the bucket 8 which can perform a tilting operation is executed smoothly.

[Positioning of Bucket 8 Using Tilting Stop Control]

The control device 50 can control the bucket 8 to stop at the target construction shape CS by executing tilting stop control while moving the bucket 8 toward the target construction shape CS. That is, the control device 50 can position the bucket 8 on the target construction shape CS. In this case, bucket stop control is also used. Bucket stop control is control of controlling the bucket 8 to stop at the target construction shape CS by controlling the working device (that is, at least one of the boom 6, the arm 7, and the bucket 8) based on the distance between the bucket 8 and the target construction shape CS. For example, in the bucket stop control, the control device 50 limits the speed at which the bucket 8 approaches the target construction shape CS by controlling the operation of the boom 6 based on the distance between the bucket 8 and the target construction shape CS. With this process, since the bucket 8 stops at the target construction shape CS, biting into the target construction shape CS is suppressed.

Figure 18:
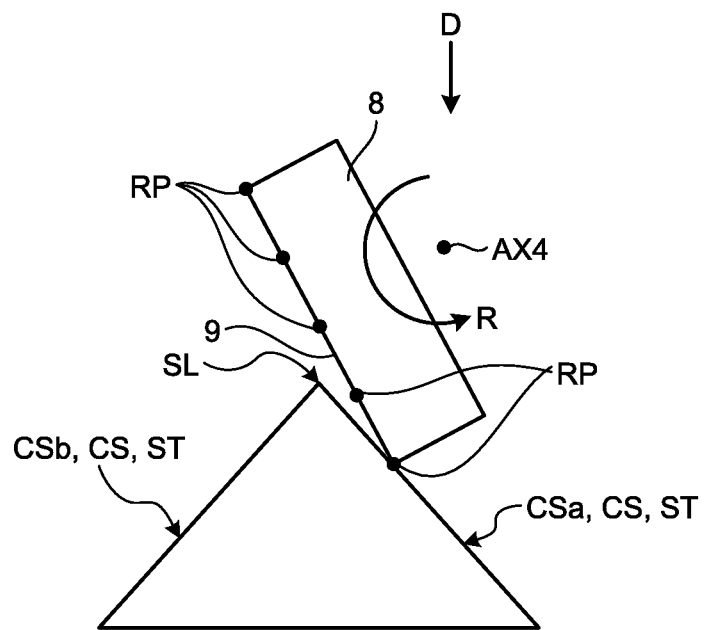
FIG. 18 is a diagram illustrating an example of a case in which tilting stop control is executed while moving a bucket.
Figure 19:
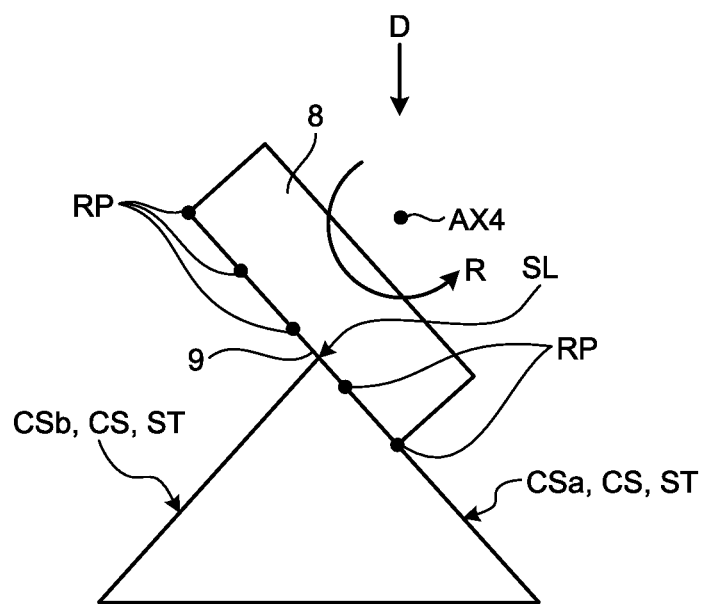
FIG. 19 is a diagram illustrating an example of a case in which tilting stop control is executed while moving a bucket.
Figure 20:
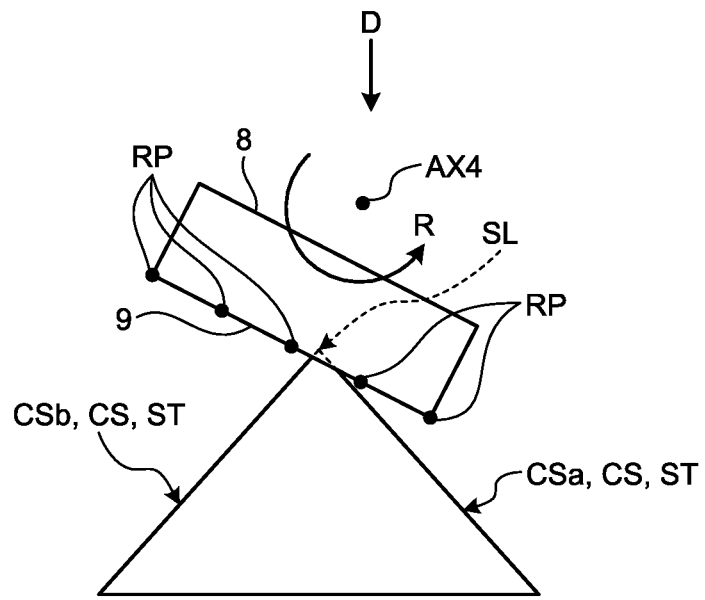
FIG. 20 is a diagram illustrating an example of a case in which tilting stop control is executed while moving a bucket.

FIGS. 18, 19, and 20 are diagrams illustrating an example of a case in which tilting stop control is executed while moving the bucket 8. In the example illustrated in FIGS. 18 and 19, the construction target of the excavator 100 has a convex cross-section. The target construction shape CS is configured such that a target construction shape CSa and a target construction shape CSb are connected at an inflection position SL. When the bucket 8 is positioned on the target construction shape CSa, the control device 50 executes tilting stop control by setting the tilting stop ground shape ST which is a portion in which the target construction shape CS and the tilting operation plane TP cross each other as a target for stopping the bucket 8.

When the bucket 8 is positioned on the target construction shape CSa, the operator of the excavator 100 operates the tilting manipulation lever 30T of the manipulation device 30 illustrated in FIG. 9 to lower the boom 6 while allowing the bucket 8 to perform a tilting operation. With the tilting operation, the bucket 8 rotates about the tilting shaft AX4 in a direction indicated by arrow R illustrated in FIGS. 18 and 19. Moreover, with lowering of the boom 6, the boom 6 moves in a direction indicated by arrow D illustrated in FIGS. 18, 19, and 20.

The control device 50 limits a tilting operation speed based on the operation distance Da between the bucket 8 and the tilting stop ground shape ST corresponding to the target construction shape CSa and limits a lowering speed Vb of the bucket 8 based on the vertical distance Db between the bucket 8 and the target construction shape CSa. The vertical distance Db is the distance between the regulation point RP of the bucket 8 and the target construction shape CSa. The distance between the regulation point RP and the target construction shape CSa obtained along a perpendicular line extended from the regulation point RP of the bucket 8 toward the target construction shape CSa is the vertical distance Db.

The control device 50 stops lowering the boom 6 when the vertical distance Db of one of the regulation points RP set to the tip 9 of the bucket 8 reaches zero. In this case, since the movement speed Vr when the bucket 8 performs a tilting operation is positive at the regulation point RP present immediately above the target construction shape CSa, the control device 50 continues the tilting operation of the bucket 8. In the example illustrated in FIG. 18, the bucket 8 rotates continuously in the direction indicated by arrow R. When the bucket 8 is separated from the target construction shape CSa with rotation of the bucket 8, the control device 50 lowers the boom 6 by the separation distance. In the present embodiment, the positive movement speed Vr means a movement speed Vr when the bucket 8 moves away from the target construction shape CSa.

As illustrated in FIG. 19, when the tip 9 of the bucket 8 comes into contact with the target construction shape CSa, although the operation distance Da reaches zero, the movement speed Vr of the regulation point RP on the target construction shape CSa is positive. In this case, although a portion of the bucket 8 comes into contact with the target construction shape CSa, the remaining portion is not in contact with the target construction shape CSa. The regulation point RP of a portion which is not present on the target construction shape CSa has a negative movement speed Vr. In the present embodiment, the negative movement speed Vr is a movement speed Vr when the bucket 8 scoops into the target construction shape CSb. The regulation point RP of a portion which is not present on the target construction shape CSa moves toward the target construction shape CSb at the movement speed Vr. Due to this, the bucket 8 continues the tilting operation in the same direction as illustrated in FIG. 20. When the bucket 8 continues the tilting operation further, the regulation point RP having the negative movement speed Vr (in the example illustrated in FIG. 20, the regulation point RP present immediately above the target construction shape CSa) comes into contact with the target construction shape CS, and the operation distance Da reaches zero, the bucket 8 stops.

Although the operator wants the bucket 8 to be positioned on the target construction shape CSa, since the bucket 8 is actually positioned on the target construction shape CSb, an operation intended by the operator is not realized. Moreover, in the course in which the bucket 8 performs a tilting operation toward the target construction shape CSb, the target construction shapes CSa and CSb near the inflection position SL may be excavated by the bucket 8.

Figure 21:
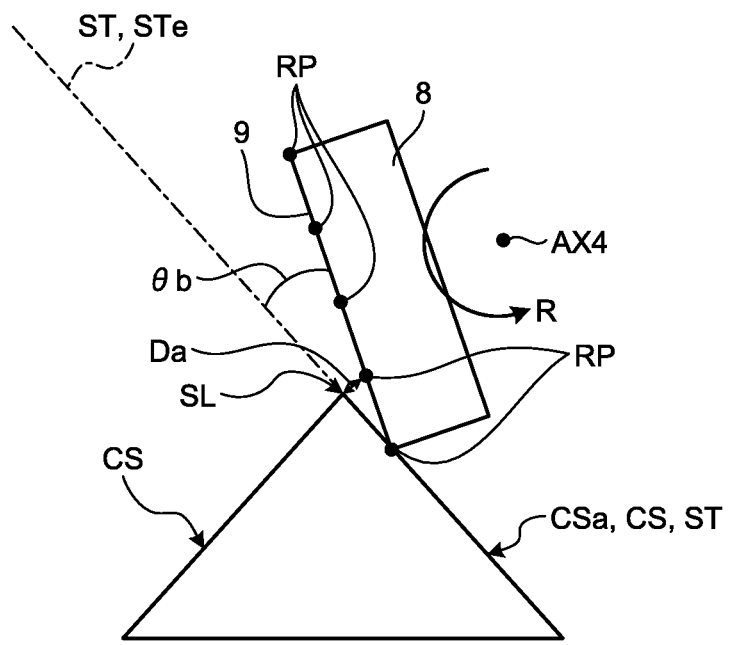
FIG. 21 is a diagram for describing stop control according to the present embodiment.
Figure 22:
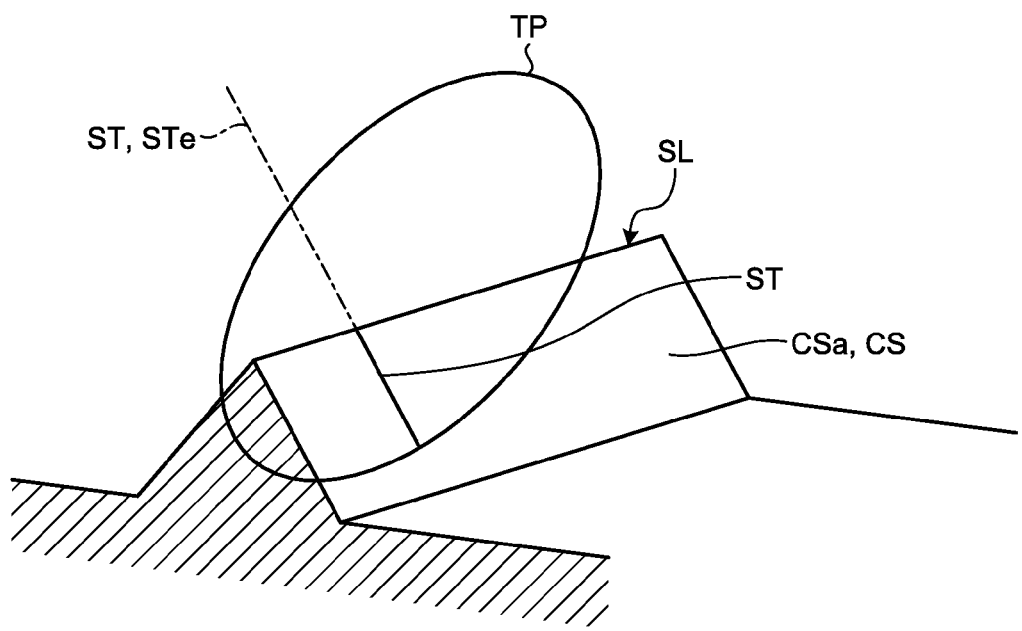
FIG. 22 is a diagram for describing stop control according to the present embodiment.

FIGS. 21 and 22 are diagrams for describing stop control according to the present embodiment. In order to allow the bucket 8 to be positioned on the target construction shape CSa on which the operator wants the bucket 8 to be positioned, in the present embodiment, the tilting stop ground shape ST of the target construction shape CSa is extended to a range exceeding the inflection position SL. As illustrated in FIG. 22, the tilting stop ground shape ST is a portion in which the tilting operation plane TP and the target construction shape CS cross each other. In the example illustrated in FIG. 21, a portion in which the tilting stop ground shape ST is extended is a portion indicated by one-dot-chain line and symbol STe. In the following description, this extended portion will be appropriately referred to as an extended stop ground shape STe. The extended stop ground shape STe is an extended target shape.

As described above, the extended stop ground shape STe is a portion which is obtained by extending the tilting stop ground shape ST in parallel to the tilting stop ground shape ST. In the present embodiment, the tilting stop ground shape ST is a segment of a straight line, and the extended stop ground shape STe is a straight line which is continuous to the tilting stop ground shape ST and is parallel to the tilting stop ground shape ST. The tilting stop ground shape ST and the extended stop ground shape STe are not limited to a segment of a straight line and a straight line, respectively but may be a plane, for example.

Figure 23:
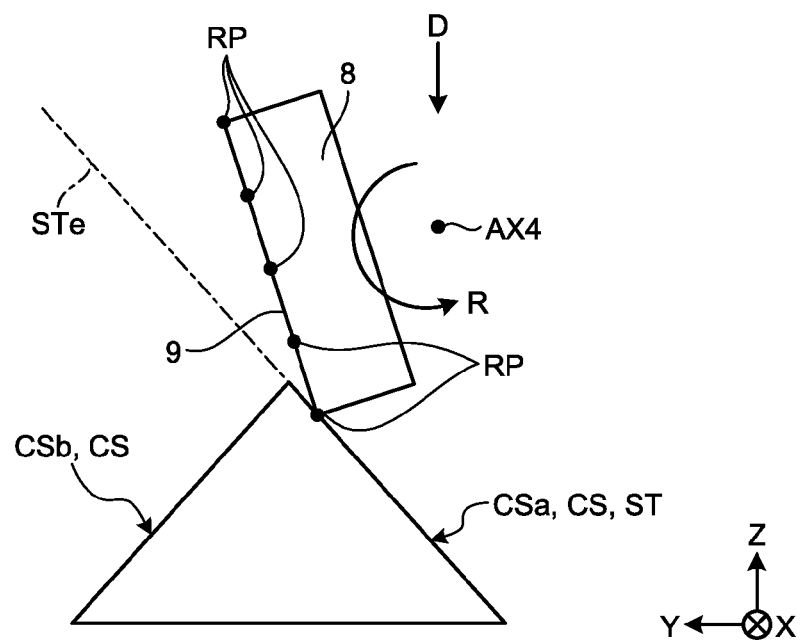
FIG. 23 is a diagram illustrating an example of a case in which tilting stop control according to the present embodiment is executed while moving a bucket.
Figure 24:
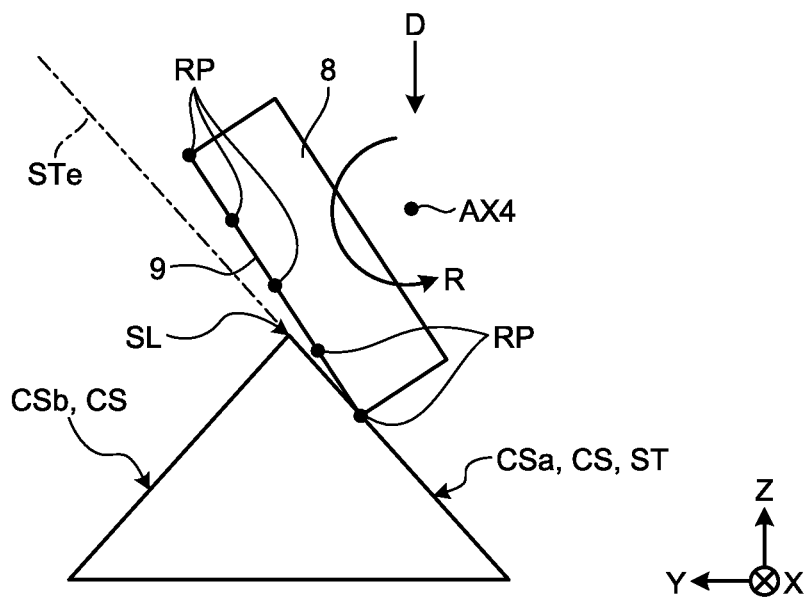
FIG. 24 is a diagram illustrating an example of a case in which tilting stop control according to the present embodiment is executed while moving a bucket.
Figure 25:
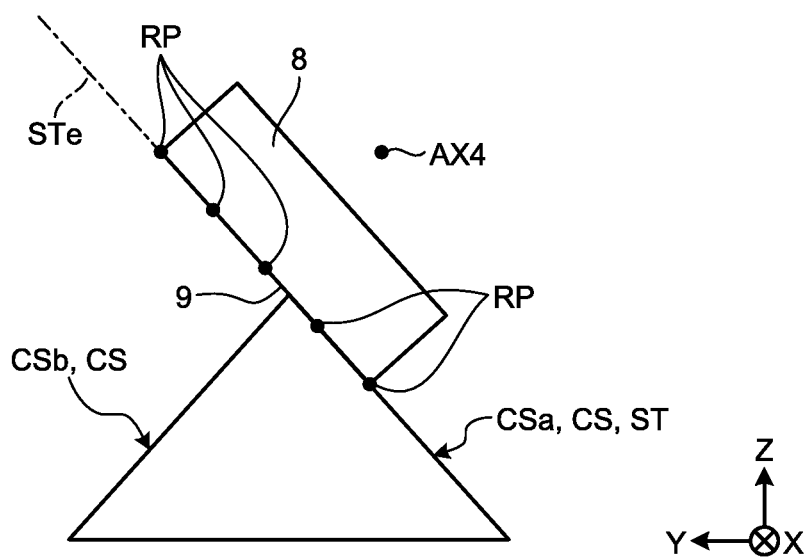
FIG. 25 is a diagram illustrating an example of a case in which tilting stop control according to the present embodiment is executed while moving a bucket.

FIGS. 23, 24, and 25 are diagrams illustrating an example of a case in which tilting stop control according to the present embodiment is executed while moving the bucket 8. When the bucket 8 is positioned on the target construction shape CSa, as illustrated in FIG. 22, the control device 50 executes tilting stop control using the tilting stop ground shape ST which is a portion in which the target construction shape CSa and the tilting operation plane TP cross each other and the extended stop ground shape STe obtained by extending the tilting stop ground shape ST as a target for stopping the tilting operation of the bucket 8.

As can be understood from the example illustrated in FIGS. 21 to 25, the extended stop ground shape STe is present in a range outside the target construction shape CSa on which the bucket 8 is to be positioned. The extended stop ground shape STe is present above the target construction shape CSb connected to the target construction shape CSa on which the bucket 8 is to be positioned at the inflection position SL. The direction "above" is a positive direction of the Z-axis of the vehicle body coordinate system (X-Y-Z). The positive direction of the Z-axis is a direction directed from the lower traveling body 3 of the excavator 100 illustrated in FIG. 1 toward the upper swinging body 2. The target shape calculation unit 51F illustrated in FIG. 9 extends the generated tilting stop ground shape ST in the direction of at least the inflection position SL to calculate the extended stop ground shape STe. The calculated extended stop ground shape STe is temporarily stored in the storage unit 52 illustrated in FIG. 9.

When positioning the bucket 8 on the target construction shape CSa, the operator of the excavator 100 operates the tilting manipulation lever 30T of the manipulation device 30 illustrated in FIG. 9 to lower the boom 6 while allowing the bucket 8 to perform a tilting operation in the direction indicated by arrow R. With the tilting operation, the bucket 8 rotates about the tilting shaft AX4 in the direction indicated by arrow R illustrated in FIGS. 23 and 24. With lowering of the boom 6, the boom 6 moves in the direction indicated by arrow D illustrated in FIGS. 23 and 24.

The control device 50 limits a tilting operation speed based on the operation distance Da between the bucket 8 and the tilting stop ground shape ST corresponding to the target construction shape CSa and a lowering speed of the bucket 8 based on the vertical distance Db between the bucket 8 and the target construction shape CSa. As illustrated in FIG. 23, the control device 50 stops lowering the boom 6 when the vertical distance Db between the bucket 8 and the target construction shape CSa reaches zero. As described above, even when lowering of the boom 6 stops, since the regulation point RP immediately above the target construction shape CSa moves at a positive movement speed Vr, the bucket 8 continues a tilting operation in a direction indicated by arrow R.

The control device 50 changes the attitude of the bucket 8 so as for the tip 9 to be parallel to the target construction shape CSa while lowering the boom 6 by a distance corresponding to the tilting operation of the bucket 8. In the present embodiment, the control device 50 executes the tilting stop control of the bucket 8 using the tilting stop ground shape ST and the extended stop ground shape STe as a target. That is, when the operation distance Da between the tilting stop ground shape ST and the extended stop ground shape STe and the regulation point RP having the negative movement speed Vr in relation to the tilting stop ground shape ST and the extended stop ground shape STe reaches zero, the control device 50 stops the tilting operation of the bucket 8 (in this example, stops the rotation in the direction indicated by arrow R). With this process, as illustrated in FIG. 25, since the bucket 8 stops in a state in which the tip 9 is positioned on the target construction shape CSa, the bucket 8 is positioned on the target construction shape CSa.

In this manner, when executing the tilting stop control of stopping the bucket 8 on the target construction shape CSa, the control device 50 sets the target ground shape for stopping the bucket 8 to the tilting stop ground shape ST and the extended stop ground shape STe. Moreover, the control device 50 stops the rotation (that is, the tilting operation) of the bucket 8 based on the operation distance Da between the bucket 8 and the tilting stop ground shape ST and the extended stop ground shape STe. As a result, the bucket 8 stops in a state in which the tip 9 is positioned on the target construction shape CSa, the operator can operate the bucket 8 as intended.

Figure 26:
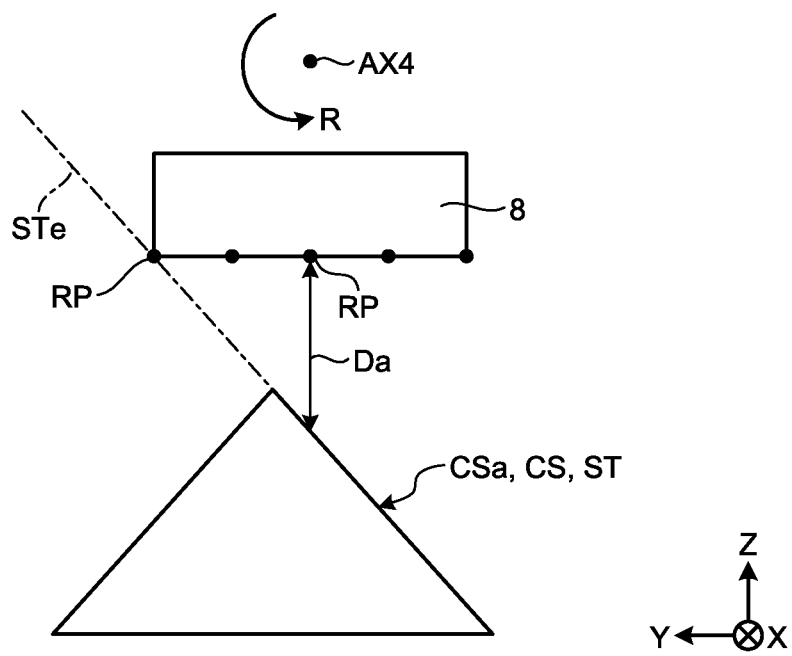
FIG. 26 is a diagram for describing a state in which a bucket stops in the air.
Figure 27:
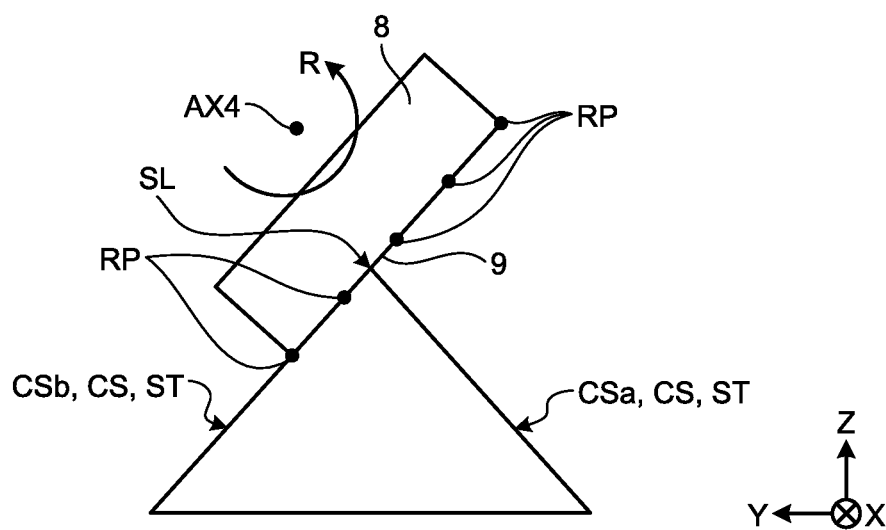
FIG. 27 is a diagram illustrating a state in which a bucket is positioned on a target construction shape.

FIG. 26 is a diagram for describing a state in which the bucket 8 stops in the air. FIG. 27 is a diagram illustrating a state in which the bucket 8 is positioned on the target construction shape CSb. In tilting stop control, when the control device 50 stops the tilting operation of the bucket 8 based on the operation distance Da between the bucket 8 and the tilting stop ground shape ST and the extended stop ground shape STe, the control device 50 stops the tilting operation of the bucket 8 at a time point at which the operation distance Da between the extended stop ground shape STe and the bucket 8 reaches zero. By doing so, as illustrated in FIG. 26, the bucket 8 stops in the air. As a result, as illustrated in FIG. 27, when the operator wants to change the attitude of the bucket 8 so that the bucket 8 is positioned on the target construction shape CSb, the operation of the bucket 8 is inhibited.

In order to obviate this phenomenon, the determination unit 51J of the control device 50 determines whether the extended stop ground shape STe will be used as a target when stopping the bucket 8 based on the operation distance Da which is the distance between the bucket 8 and the tilting stop ground shape ST corresponding to the target construction shape CSa. Specifically, the determination unit 51J sets the extended stop ground shape STe as a target when stopping the bucket 8 when the operation distance Da between the regulation point RP set to the bucket 8 and the tilting stop ground shape ST corresponding to the target construction shape CSa present immediately below the regulation point RP is equal to or smaller than a threshold. Moreover, the determination unit 51J does not set the extended stop ground shape STe as the target when stopping the bucket 8 when the operation distance Da between the regulation point RP set to the bucket 8 and the tilting stop ground shape ST corresponding to the target construction shape CSa present immediately below the regulation point RP is larger than the threshold. The direction immediately above the regulation point RP is a negative direction of the Z-axis of the vehicle body coordinate system (X-Y-Z) of the excavator 100. The negative direction of the Z-axis is a direction directed from the upper swinging body 2 of the excavator 100 illustrated in FIG. 1 toward the lower traveling body 3.

In the example illustrated in FIG. 26, the operation distance Da between the extended stop ground shape STe and one regulation point RP having the negative movement speed Vr among the regulation points RP of the bucket 8 is zero. However, the operation distance Da between the other regulation point RP of the bucket 8 and the tilting stop ground shape ST corresponding to the target construction shape CSa present immediately below the regulation point RP is larger than the threshold. Due to this, the determination unit does not set the extended stop ground shape STe as the target when stopping the bucket 8. As a result, the bucket 8 does not stop in the air and is positioned on the target construction shape CSa.

Figure 28:
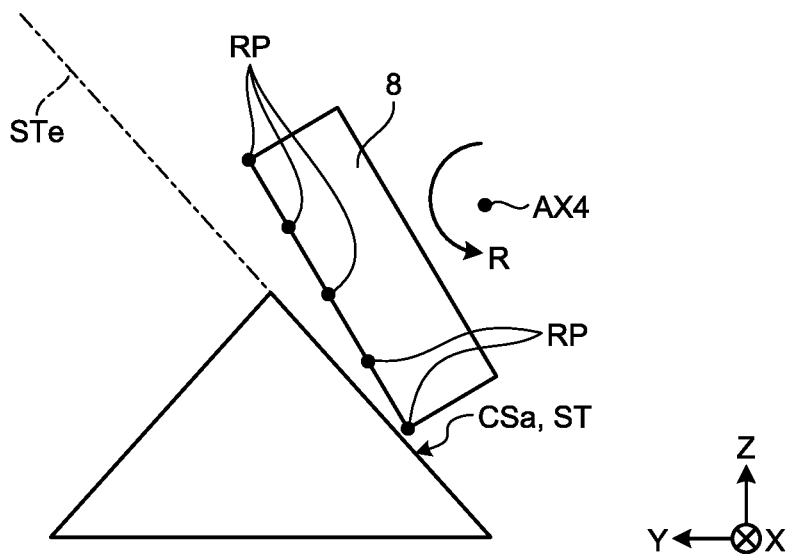
FIG. 28 is a diagram for describing an example of determining whether an extended stop ground shape will be used as a target when stopping the bucket based on overlap between the bucket and the target construction shape.
Figure 29:
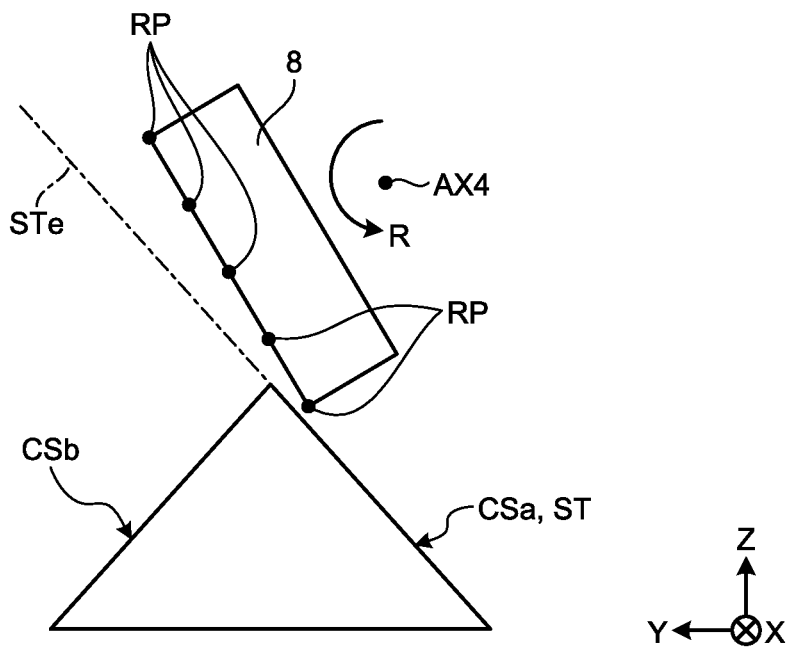
FIG. 29 is a diagram for describing an example of determining whether an extended stop ground shape will be used as a target when stopping the bucket based on overlap between the bucket and the target construction shape.

FIGS. 28 and 29 are diagrams for describing an example of determining whether an extended stop ground shape STe will be used as a target when stopping the bucket 8 based on overlap between the bucket 8 and the target construction shape CSa. As in the example illustrated in FIG. 28, in a state in which overlap between the bucket 8 and the target construction shape CSa is large, when the operator performs an operation for allowing the bucket 8 to perform such an operation as illustrated in FIGS. 23 to 25, the operator may want to position the bucket 8 on the target construction shape CSa. As in the example illustrated in FIG. 29, when the bucket 8 performs a tilting operation in a state in which overlap between the bucket 8 and the target construction shape CSa is small, the operator may want to position the bucket 8 on the target construction shape CSb by rotating the bucket 8 about the tilting shaft AX4 toward the target construction shape CSb.

The determination unit 51J determines whether the extended stop ground shape STe will be used as a target when stopping the bucket 8 based on overlap between the bucket 8 and the target construction shape CSa. Specifically, when a number of regulation points RP equal to or larger than a first threshold among the plurality of regulation points RP set to the bucket 8 overlap the target construction shape CSa present immediately below the bucket 8, the determination unit 51J uses the extended stop ground shape STe as the target when stopping the bucket 8. In this case, the control device 50 uses both the tilting stop ground shape ST and the extended stop ground shape STe as the target when stopping the bucket 8 during the tilting stop control.

When a number of regulation points RP equal to or smaller than a second threshold smaller than the first threshold among the plurality of regulation points RP set to the bucket 8 overlap the target construction shape CSa present immediately below the bucket 8, the determination unit 51J does not use the extended stop ground shape STe as the target when stopping the bucket 8. In this case, the control device 50 uses the tilting stop ground shape ST as the target when stopping the bucket 8 during the tilting stop control.

In this manner, since the determination unit 51J determines whether the extended stop ground shape STe will be used as a target when stopping the bucket 8 based on overlap between the bucket 8 and the target construction shape CSa, it is possible to reliably determine whether the operator wants to position the bucket 8 on the target construction shape CSa. As a result, the control device 50 can position the bucket 8 on the target construction shape CSa intended by the operator.

The target construction shape CSa present immediately below the bucket 8 is the target construction shape CSa present in the negative direction of the Z-axis direction when seen from the bucket 8 in the vehicle body coordinate system (X-Y-Z). The overlap between the bucket 8 and the target construction shape CSa is represented by the degree of overlap (that is, the amount of overlap, the proportion of overlap, or the like) between the bucket 8 and the target construction shape CSa when the bucket 8 and the target construction shape CSa are seen from the positive direction of the Z-axis of the vehicle body coordinate system (X-Y-Z).

Figure 30:
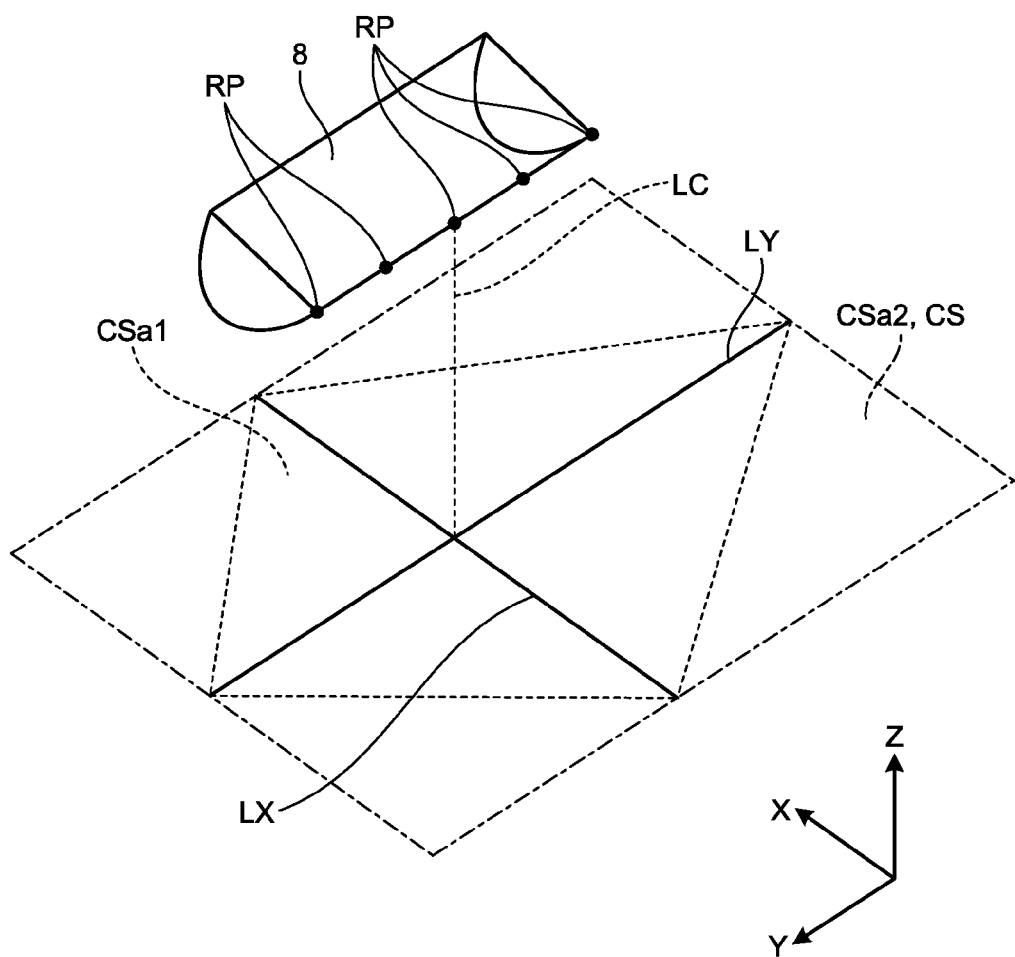
FIG. 30 is a diagram illustrating a bucket and a target construction shape in a vehicle body coordinate system.

FIG. 30 is a diagram illustrating the bucket 8 and the target construction shape CSa in the vehicle body coordinate system (X-Y-Z). The target construction shape CSa is generated by the target construction shape generation unit 51D based on the lines LX and LY. The intersection between the lines LX and LY crosses a straight line LC that is parallel to the working device operation plane WP and the Z-axis of the vehicle body coordinate system (X-Y-Z) and passes through a portion (in this example, the regulation point RP) of the bucket 8. The target construction shape generation unit 51D can generate a target construction shape CSa1 indicated by a broken line and a target construction shape CSa2 indicated by one-dot-chain line based on the lines LX and LY. In the present embodiment, the determination unit 51J may use either the target construction shape CSa1 or the target construction shape CSa2 when calculating the overlap between the bucket 8 and the target construction shape CSa.

The determination unit 51J determines whether the extended stop ground shape STe will be used as a target when stopping the bucket 8 based on the attitude of the bucket 8 (in the present embodiment, the angle θb between the target construction shape CSa and the tip 9 of the bucket 8). The determination unit 51J calculates a straight line indicating the tip 9 from the plurality of regulation points RP set to the tip 9 of the bucket 8. Moreover, the determination unit 51J calculates the angle θb between the calculated straight line and the tilting stop ground shape ST present in the target construction shape CSa.

The determination unit 51J sets the extended stop ground shape STe as the target when stopping the bucket 8 when the θb is equal to or smaller than a first threshold angle. In this case, the control device 50 sets both the tilting stop ground shape ST and the extended stop ground shape STe as the target when stopping the bucket 8 during the tilting stop control. The determination unit 51J does not set the extended stop ground shape STe as the target when stopping the bucket 8 when the angle θb is larger than a second threshold angle larger than the first threshold angle. In this case, the control device 50 sets the tilting stop ground shape ST as the target when stopping the bucket 8 during the tilting stop control.

The angle θb illustrated in FIG. 21 is an indicator indicating that the bucket 8 (in the present embodiment, the tip 9 of the bucket 8) follows the target construction shape CSa. When the angle θb is small, it is considered that the operator wants to position the bucket 8 on the target construction shape CSa. When the angle θb is large, it is considered that the operator does not want to position the bucket 8 on the target construction shape CSa. By using the angle θb, the determination unit 51J can determine with high accuracy whether the operator wants to position the bucket 8 on the target construction shape CSa.

Figure 31:
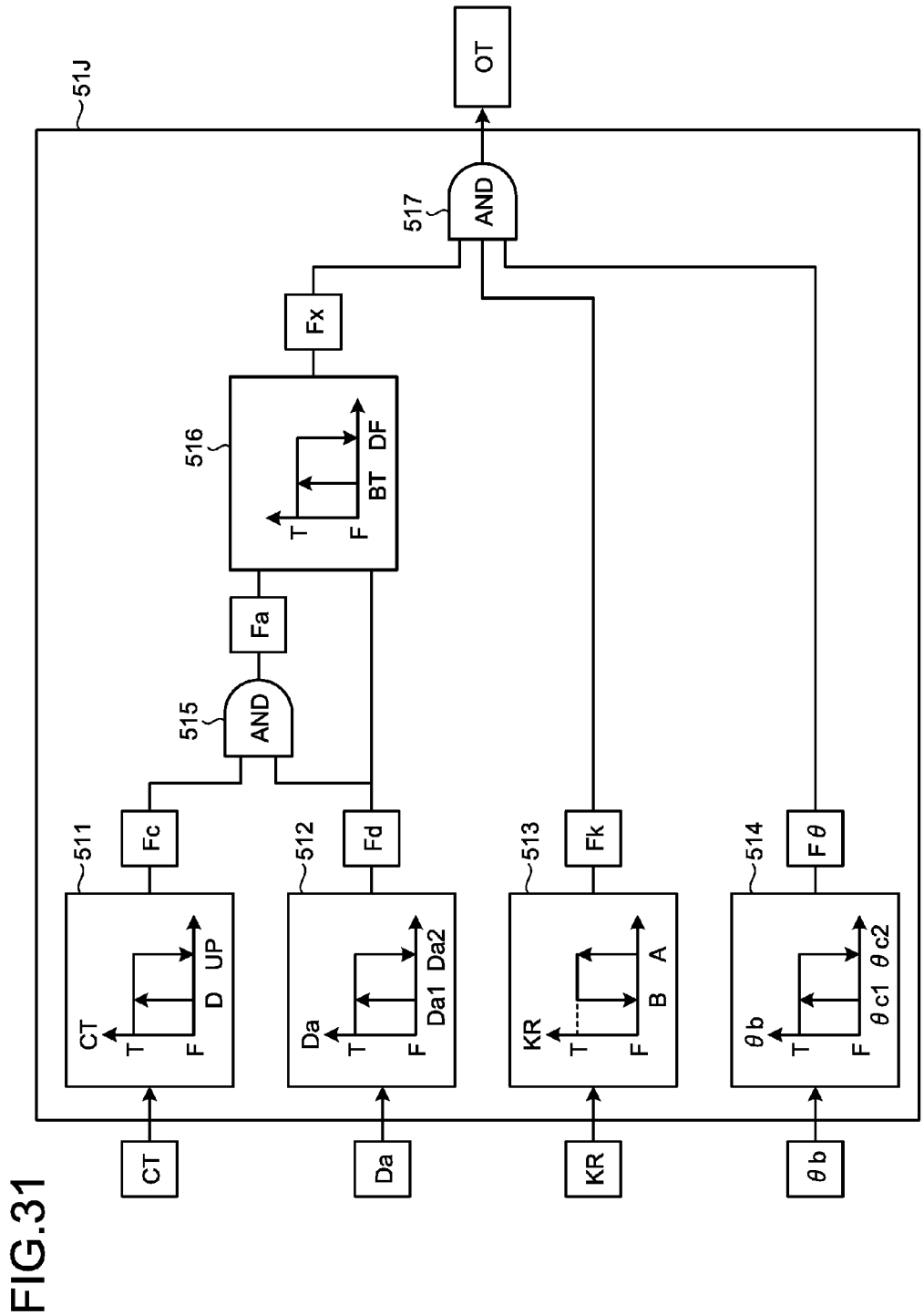
FIG. 31 is a control block diagram of a determination unit.

FIG. 31 is a control block diagram of the determination unit 51J. The determination unit 51J includes a manipulation state determination unit 511, an operation distance determination unit 512, an overlap determination unit 513, a posture determination unit 514, a first logical product calculation unit 515, a distance determination unit 516, and a second logical product calculation unit 517. The manipulation state determination unit 511 generates an operation flag Fc based on a manipulation state CT of the right manipulation lever 30R for operating the boom 6. When the manipulation state CT of the right manipulation lever 30R is boom lowering D, the manipulation state determination unit 511 sets the operation flag Fc to TRUE (in the present embodiment, 1). When the manipulation state CT of the right manipulation lever 30R is boom raising UP, the manipulation state determination unit 511 sets the operation flag Fc to FALSE (in the present embodiment, 0).

The operation distance determination unit 512 generates an operation distance flag Fd based on the operation distance Da. When the operation distance Da is equal to or smaller than a first threshold distance Da1, the operation distance determination unit 512 sets the operation distance flag Fd to TRUE (in the present embodiment, 1). When the operation distance Da is equal to or larger than a second threshold distance Da2, the operation distance determination unit 512 sets the operation distance flag Fd to FALSE (in the present embodiment, 0).

The overlap determination unit 513 generates an overlap determination flag Fk based on an overlap proportion KR. The overlap proportion KR is the proportion of the regulation points RP that overlap the target construction shape CSa present immediately below the bucket 8 among all regulation points RP set to the bucket 8. When the overlap proportion KR is equal to or larger than a first threshold A, the overlap determination unit 513 sets the overlap determination flag Fk to TRUE (in the present embodiment, 1). When the overlap proportion KR is equal to or smaller than a second threshold B smaller than the first threshold A, the overlap determination unit 513 sets the overlap determination flag Fk to FALSE (in the present embodiment, 0).

In this manner, the determination unit 51J sets the magnitude of overlap when determining that the extended stop ground shape STe is set as the target when stopping the bucket 8 to be larger than the magnitude of overlap when determining that the extended stop ground shape STe is not set as the target when stopping the bucket 8. By doing so, it is possible to suppress the extended stop ground shape STe from disappearing in the course in which the control device 50 adjusts the tilting operation of the bucket 8.

The posture determination unit 514 generates an attitude determination flag Fθ based on the attitude (in the present embodiment, the angle θb) of the bucket 8 in relation to the target construction shape CSa. When the angle θb is equal to or smaller than a first threshold angle θc1, the posture determination unit 514 sets the attitude determination flag Fθ to TRUE (in the present embodiment, 1). When the angle θb is equal to or larger than a second threshold θc2, the posture determination unit 514 sets the attitude determination flag Fθ to FALSE (in the present embodiment, 0).

The first logical product calculation unit 515 calculates a logical product (that is, AND) between the operation flag Fc and the operation distance flag Fd and outputs a first calculation result Fa to the distance determination unit 516. The first calculation result Fa is set to 1 (TRUE) when both the operation flag Fc and the operation distance flag Fd are TRUE (1) and is set to 0 (FALSE) for other combinations.

The distance determination unit 516 outputs a second calculation result Fx to the second logical product calculation unit 517 based on the first calculation result Fa and the operation distance flag Fd. The second calculation result Fx is set to TRUE (1) when both the first calculation result Fa and the operation distance flag Fd are TRUE (BT: Both TRUE) and is set to FALSE (0) when the operation distance flag Fd is FALSE (DF: Distance FALSE).

The second logical product calculation unit 517 calculates a logical product between the second calculation result Fx, the overlap determination flag Fk, and the attitude determination flag Fθ and outputs the calculation result as a determination result OT of the determination unit 51J. The determination result OT is set to TRUE (1) when all of the second calculation result Fx, the overlap determination flag Fk, and the attitude determination flag Fe are TRUE (1) and is set to FALSE (0) for other combinations.

When the determination result OT is TRUE, the extended stop ground shape STe is used as the target when stopping the bucket 8. In this case, the control device 50 sets both the tilting stop ground shape ST and the extended stop ground shape STe as the target when stopping the bucket 8 during the tilting stop control. When the determination result OT is FALSE, the extended stop ground shape STe is not set as the target when stopping the bucket 8. In this case, the control device 50 sets the tilting' stop ground shape ST as the target when stopping the bucket 8 during the tilting stop control.

When the operation flag Fc is FALSE (0) (that is, the manipulation state CT of the right manipulation lever 30R is boom lowering UP), the determination unit 51J sets the operation distance flag Fd, the overlap determination flag Fk, and the attitude determination flag Fθ to FALSE (0). This is because, when the boom 6 is raised, since the bucket 8 moves away from the target construction shape CSa, it is possible to determine that the operator does not want to position the bucket 8 on the target construction shape CSa.

[Control Method]

Figure 32:
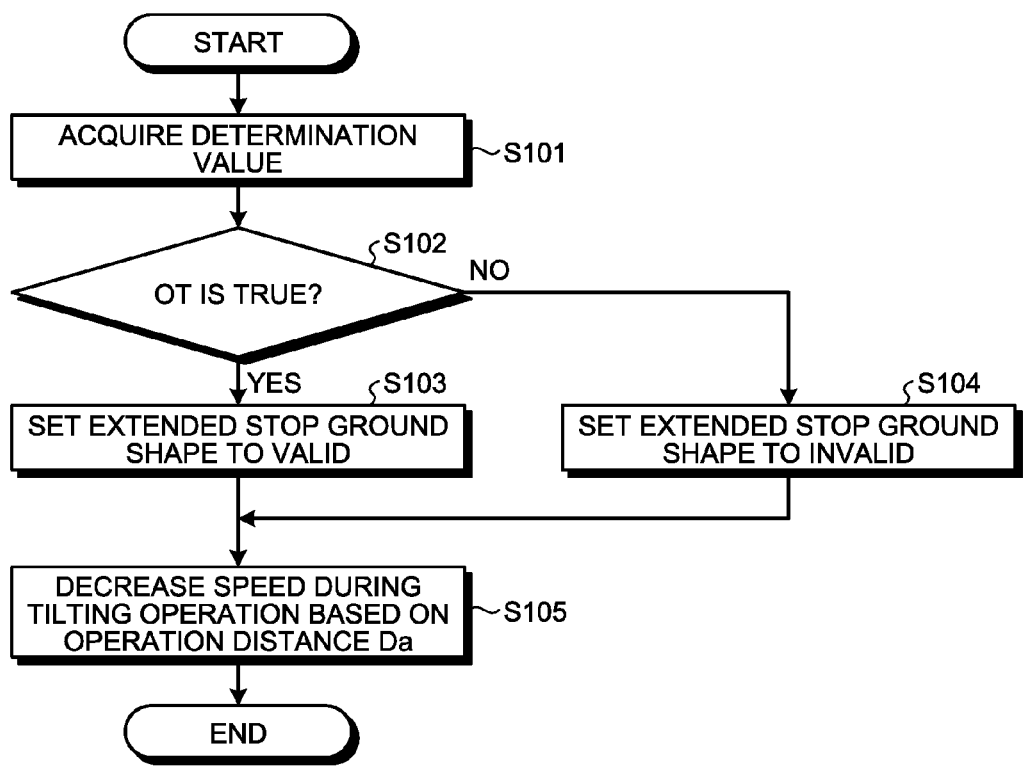
FIG. 32 is a flowchart illustrating an example of a work machine control method according to the present embodiment.

FIG. 32 is a flowchart illustrating an example of a work machine control method according to the present embodiment. In step S101, the determination unit 51J of the control device 50 obtains a determination value used for determining whether the extended stop ground shape STe will be used as a target when stopping the bucket 8. Specifically, the determination unit 51J acquires the manipulation state CT from the right manipulation lever 30R and the operation distance Da from the restriction speed determination unit 51H and calculates the angle θb and the overlap proportion KR. These values are the above-described determination value.

The determination unit 51J calculates the determination result OT using the determination value obtained in step S101 and outputs the determination result OT. When it is determined in step S102 that the determination result OT is TRUE (step S102: Yes), the extended stop ground shape STe is set to be valid in step S103 (that is, the extended stop ground shape STe is set as the target when stopping the bucket 8). In this case, the control device 50 sets both the tilting stop ground shape ST and the extended stop ground shape STe as the target when stopping the bucket 8 during the tilting stop control.

When it is determined in step S102 that the determination result OT is not TRUE (that is, FALSE) (step S102: No), the extended stop ground shape STe is set to be invalid in step S104 (that is, the extended stop ground shape STe is not set as the target when stopping the bucket 8). In this case, the control device 50 sets the tilting stop ground shape ST as the target when stopping the bucket 8 during the tilting stop control.

In step S105, the control device 50 decelerates the speed at which the bucket 8 performs a tilting operation based on the operation distance Da between the bucket 8 and the target when stopping the bucket 8, determined in step ST103 or S104. In this case, the working device control unit 51G calculates the control signal for the control valve 37 based on the movement speed Vr of the regulation point RP of the bucket 8 calculated from the operation amount of the tilting manipulation lever 30T and the restriction speed U determined by the restriction speed determination unit 51H.

When the operator performs an operation for allowing the bucket 8 to perform such an operation as illustrated in FIGS. 23 to 25, the working device control unit 51G calculates a control signal for changing the movement speed Vr to the restriction speed U and outputs the control signal to the control valve 37. The control valve 37 controls the pilot pressure based on the control signal output from the working device control unit 51G. With this process, the movement speed Vr of the regulation point RP of the bucket 8 is limited. When the bucket 8 that performs a tilting operation approaches the target construction shape CSa and the operation distance Da at all regulation points RP reaches zero, the tilting operation of the bucket 8 stops. As a result, the bucket 8 is positioned on the target construction shape CSa.

As described above, the present embodiment controls the rotation of the bucket 8 based on the distance between the bucket 8 which is a working tool, the tilting stop ground shape ST, and the extended stop ground shape STe obtained by extending the tilting stop ground shape ST. Thus, even when the target construction shape CS has a discontinuous portion, since the tilting operation of the bucket 8 can be stopped based on the extended stop ground shape STe obtained by extending the tilting stop ground shape ST, it is possible to position the bucket 8 on the target construction shape CSa on which the bucket 8 is to be positioned. Moreover, even when the target construction shape CS has a discontinuous portion, since the tilting operation of the bucket 8 is stopped, it is possible to decrease the possibility that the discontinuous portion of the target construction shape CS corresponding to the inflection position SL of the target construction shape CS is excavated by the bucket 8.

In the present embodiment, the control device 50 generates the extended stop ground shape STe obtained by extending the tilting stop ground shape ST in advance and sets the extended stop ground shape STe to be valid when controlling the rotation of the bucket 8 based on the distance between the bucket 8 and the tilting stop ground shape ST and the extended stop ground shape STe. The present invention is not limited this control, but the control device 50 may generate the extended stop ground shape STe when controlling the rotation of the bucket 8 based on the distance between the bucket 8 and the tilting stop ground shape ST and the extended stop ground shape STe.

In the present embodiment, the control device 50 determines whether the extended stop ground shape STe will be used as a target when controlling the rotation of the bucket 8 or not based on the overlap between the bucket 8 and the target construction shape CSa, the operation distance Da between the bucket 8 and the tilting stop ground shape ST corresponding to the target construction shape CSa, the attitude of the bucket 8, and the manipulation state CT of the working device 1. With this process, the control device 50 can determine the intention that the operator of the excavator 100 wants to position the bucket 8 on the target construction shape CSa. Thus, when the operator does not have any intention to position the bucket 8 on the target construction shape CSa, the tilting stop control of the bucket 8 with respect to the extended stop ground shape STe is not executed and the tilting operation of the bucket 8 is allowed. In this case, the tilting stop control of the bucket 8 with respect to the tilting stop ground shape ST is executed. Moreover, when the operator has an intention to position the bucket 8 on the target construction shape CSa, the bucket 8 is positioned on the target construction shape CSa by the stop control. As a result, the control device 50 can realize the operation of the bucket 8 according to the intention of the operator.

In the present embodiment, the control device 50 provides hysteresis in the determination conditions such as the overlap between the bucket 8 and the target construction shape CSa, the operation distance Da between the bucket 8 and the tilting stop ground shape ST corresponding to the target construction shape CSa, and the angle θb between the tip 9 of the bucket 8 and the target construction shape CSa depending on whether the extended stop ground shape STe is used as a target when controlling the rotation of the bucket 8 or not. By doing so, it is possible to suppress the extended stop ground shape STe from disappearing in the course in which the control device 50 finely adjusts the tilting operation of the bucket 8. However, the present invention is not limited to providing hysteresis in the determination conditions and hysteresis may not be provided.

In the present embodiment, although tilting stop control of stopping the tilting operation of the bucket 8 has been described as an example of control that the working device control unit 51G performs to control the rotation of the bucket 8, an example of control that the working device control unit 51G performs to control the rotation of the bucket 8 is not limited to tilting stop control. For example, the working device control unit 51G may execute intervention control of moving the bucket 8 in a direction away from the target construction shape CS when the bucket 8 bites into the target construction shape CS by performing a tilting operation. The working device control unit 51G may execute intervention control based on the distance between the bucket 8 which is a working tool, the tilting stop ground shape ST, and the extended stop ground shape STe obtained by extending the tilting stop ground shape ST.

In the present embodiment, although the bucket 8 is a tilting bucket, the bucket 8 may be a rotating bucket, for example. A rotating bucket is a bucket that rotates about a shaft line that vertically crosses the bucket shaft AX3. The working device control unit 51G may execute at least one of stop control and intervention control on the rotating bucket based on the distance between the bucket 8 and a rotate stop ground shape and an extended rotate stop ground shape obtained by extending the rotate stop ground shape. The rotate stop ground shape is calculated by the same method as the tilting stop ground shape ST. The working device control unit 51G may execute at least one of the stop control and the intervention control based on the distance between the bucket 8 and the rotate stop ground shape and the extended rotate stop ground shape obtained by extending the rotate stop ground shape when the bucket 8 rotates about the bucket shaft AX3.

In the present embodiment, although the work machine is an excavator, the constituent elements described in the embodiment may be applied to a work machine having a working device, different from the excavator.

While the present embodiment has been described, the present embodiment is not limited to the contents described above. Moreover, the above-described constituent elements include those easily conceivable by a person of ordinary skill in the art, those substantially the same as the constituent elements, and those falling in the range of so-called equivalents. Further, the above-described constituent elements can be appropriately combined with each other. Furthermore, various omissions, substitutions, or changes in the constituent elements can be made without departing from the spirit of the embodiment.

REFERENCE SIGNS LIST

1 WORKING DEVICE
2 UPPER SWINGING BODY
3 LOWER TRAVELING BODY
6 BOOM
7 ARM
8 BUCKET
8C BLADE
9 TIP
11 BOOM CYLINDER
12 ARM CYLINDER
13 BUCKET CYLINDER
14 TILTING CYLINDER
20 POSITION DETECTION DEVICE
30 MANIPULATION DEVICE
30T TILTING MANIPULATION LEVER
30R RIGHT MANIPULATION LEVER
50 CONTROL DEVICE
51 PROCESSING UNIT
51A VEHICLE BODY POSITION DATA ACQUISITION UNIT
51B WORKING DEVICE ANGLE DATA ACQUISITION UNIT
51Ca CANDIDATE REGULATION POINT POSITION DATA CALCULATION UNIT
51D TARGET CONSTRUCTION SHAPE GENERATION UNIT
51Cb REGULATION POINT POSITION DATA CALCULATION UNIT
51E OPERATION PLANE CALCULATION UNIT
51F TARGET SHAPE CALCULATION UNIT
51G WORKING DEVICE CONTROL UNIT
51H RESTRICTION SPEED DETERMINATION UNIT
51J DETERMINATION UNIT
52 STORAGE UNIT
53 INPUT/OUTPUT UNIT
100 EXCAVATOR
200 CONTROL SYSTEM
300 HYDRAULIC SYSTEM
400 DETECTION SYSTEM
511 MANIPULATION STATE DETERMINATION UNIT
512 OPERATION DISTANCE DETERMINATION UNIT
513 OVERLAP DETERMINATION UNIT
514 POSTURE DETERMINATION UNIT
515 FIRST LOGICAL PRODUCT CALCULATION UNIT
516 DISTANCE DETERMINATION UNIT
517 SECOND LOGICAL PRODUCT CALCULATION UNIT
AX1 BOOM SHAFT
AX2 ARM SHAFT
AX3 TILTING SHAFT
AX4 TILTING SHAFT
CS, CSa, CSb TARGET CONSTRUCTION SHAPE
CT MANIPULATION STATE
Da OPERATION DISTANCE
ST TILTING STOP GROUND SHAPE
STe EXTENDED STOP GROUND SHAPE
TP TILTING OPERATION PLANE

The invention claimed is:

1. A work machine control system that controls a work machine including a working device including a working tool that rotates about a shaft line, comprising:
a target construction shape generation unit that generates a target construction shape indicating a target shape of a construction target of the work machine;
a target shape calculation unit that calculates a control target shape which is a target shape when controlling rotation of the working tool from the target construction shape and calculates an extended target shape obtained by extending the control target shape; and
a working device control unit that controls the rotation of the working tool about the shaft line based on a distance between the working tool and the control target shape and the extended target shape.

2. The work machine control system according to claim 1, further comprising:
a determination unit that determines whether the extended target shape will be used as a target when the working device control unit controls the rotation of the working tool or not, wherein
when the determination unit determines that the extended target shape is to be used as a target when the working device control unit controls the rotation of the working tool, the working device control unit controls the rotation of the working tool about the shaft line based on the distance between the working tool and the control target shape and the extended target shape, and
when the determination unit determines that the extended target shape is not to be used as a target when the working device control unit controls the rotation of the working tool, the working device control unit controls the rotation of the working tool about the shaft line based on the distance between the working tool and the control target shape.

3. The work machine control system according to claim 2, wherein
the determination unit determines whether the extended target shape will be used as the target when stopping the working tool or not based on overlap between the working tool and the target construction shape, the distance between the working tool and the control target shape corresponding to the target construction shape, an attitude of the working tool, and a manipulation state of the working device.

4. The work machine control system according to claim 3, wherein
the determination unit sets a magnitude of the overlap when the extended target shape is determined as the target when stopping the working tool to be larger than a magnitude of the overlap when the extended target shape is not determined as the target.

5. The work machine control system according to claim 1, further comprising:

a regulation point position data calculation unit that calculates position data of a regulation point set to the working tool; and an operation plane calculation unit that calculates an operation plane which passes through the regulation point and is orthogonal to the shaft line, wherein the target shape calculation unit sets a portion in which the target construction shape and the operation plane cross each other as the control target shape and sets a portion obtained by extending the control target shape in parallel to the control target shape as the extended target shape.

6. A work machine comprising:

an upper swinging body;

a lower traveling body that supports the upper swinging body;

a working device which includes a boom that rotates about a first shaft, an arm that rotates about a second shaft, and a bucket that rotates about a third shaft, the working device being supported on the upper swinging body; and the work machine control system according to claim 1, wherein the working tool is at least one of the bucket, the arm, the boom, and the upper swinging body.

7. The work machine according to claim 6, wherein the working tool is the bucket and the shaft line is orthogonal to the third shaft.

8. A work machine control method of controlling a work machine including a working device including a working tool that rotates about a shaft line, comprising:

generating a target construction shape indicating a target shape of a construction target of the work machine;

calculating a control target shape which is a target shape when controlling rotation of the working tool from the target construction shape and calculating an extended target shape obtained by extending the control target shape; and controlling the rotation of the working tool about the shaft line based on a distance between the working tool and the control target shape and the extended target shape.

* * * * *